(12) United States Patent
George et al.

(10) Patent No.: US 11,278,926 B2
(45) Date of Patent: Mar. 22, 2022

(54) PIPELINE SPRAYER AND METHOD

(71) Applicant: CRC-EVANS PIPELINE INTERNATIONAL, INC., Houston, TX (US)

(72) Inventors: Michael George, Tomball, TX (US); Garrett Barlett, Claremore, OK (US); Timothy Bond, Cypress, TX (US); Siddharth Mallick, Spring, TX (US)

(73) Assignee: CRC-Evans Pipeline International, Inc., Houston, TX (US)

( * ) Notice: Subject to any disclaimer, the term of this patent is extended or adjusted under 35 U.S.C. 154(b) by 0 days.

(21) Appl. No.: 16/722,227

(22) Filed: Dec. 20, 2019

(65) Prior Publication Data

US 2021/0187534 A1 Jun. 24, 2021

(51) Int. Cl.
| | |
|---|---|
| *B05B 13/04* | (2006.01) |
| *B05B 12/08* | (2006.01) |
| *B05C 5/02* | (2006.01) |
| *B05B 7/26* | (2006.01) |

(52) U.S. Cl.
CPC ........ *B05B 13/0436* (2013.01); *B05B 12/084* (2013.01); *B05B 12/087* (2013.01); *B05B 13/0426* (2013.01); *B05B 13/0431* (2013.01); *B05C 5/02* (2013.01); *B05C 5/0208* (2013.01); *B05C 5/0216* (2013.01); *B05C 5/0241* (2013.01); *B05B 7/26* (2013.01); *B05D 2254/02* (2013.01)

(58) Field of Classification Search
None
See application file for complete search history.

(56) References Cited

U.S. PATENT DOCUMENTS

| | | | |
|---|---|---|---|
| 3,063,697 A | 11/1962 | Galezniak | |
| 4,007,705 A | 2/1977 | Sherer et al. | |
| 5,207,833 A | 5/1993 | Hart | |
| 6,881,266 B1 | 4/2005 | Daykin et al. | |
| 8,844,463 B2 | 9/2014 | Bamford | |
| 8,962,094 B2 | 2/2015 | Taylor et al. | |
| 2012/0272897 A1* | 11/2012 | Bamford | B05B 13/0436 118/663 |
| 2013/0214034 A1* | 8/2013 | Leiden | B29C 48/02 228/176 |
| 2019/0314846 A1* | 10/2019 | Ellis | B05B 12/00 |

FOREIGN PATENT DOCUMENTS

| | | |
|---|---|---|
| EP | 3059482 B1 | 7/2018 |
| WO | 0132316 A | 5/2001 |
| WO | 2011162747 A | 12/2011 |

OTHER PUBLICATIONS

Extended European Search Report dated May 21, 2021.

* cited by examiner

*Primary Examiner* — Jethro M. Pence
(74) *Attorney, Agent, or Firm* — Kofi A. Schulterbrandt

(57) ABSTRACT

Provided is an apparatus for coating a girth weld and a cutback region surrounding said girth weld, said apparatus having lateral travel at least equal to the length of the cutback region and circumferential rotational travel around the pipe. The apparatus can provide a multiple component coating accurately and safely, without the need for solvent flushing of the apparatus.

12 Claims, 26 Drawing Sheets

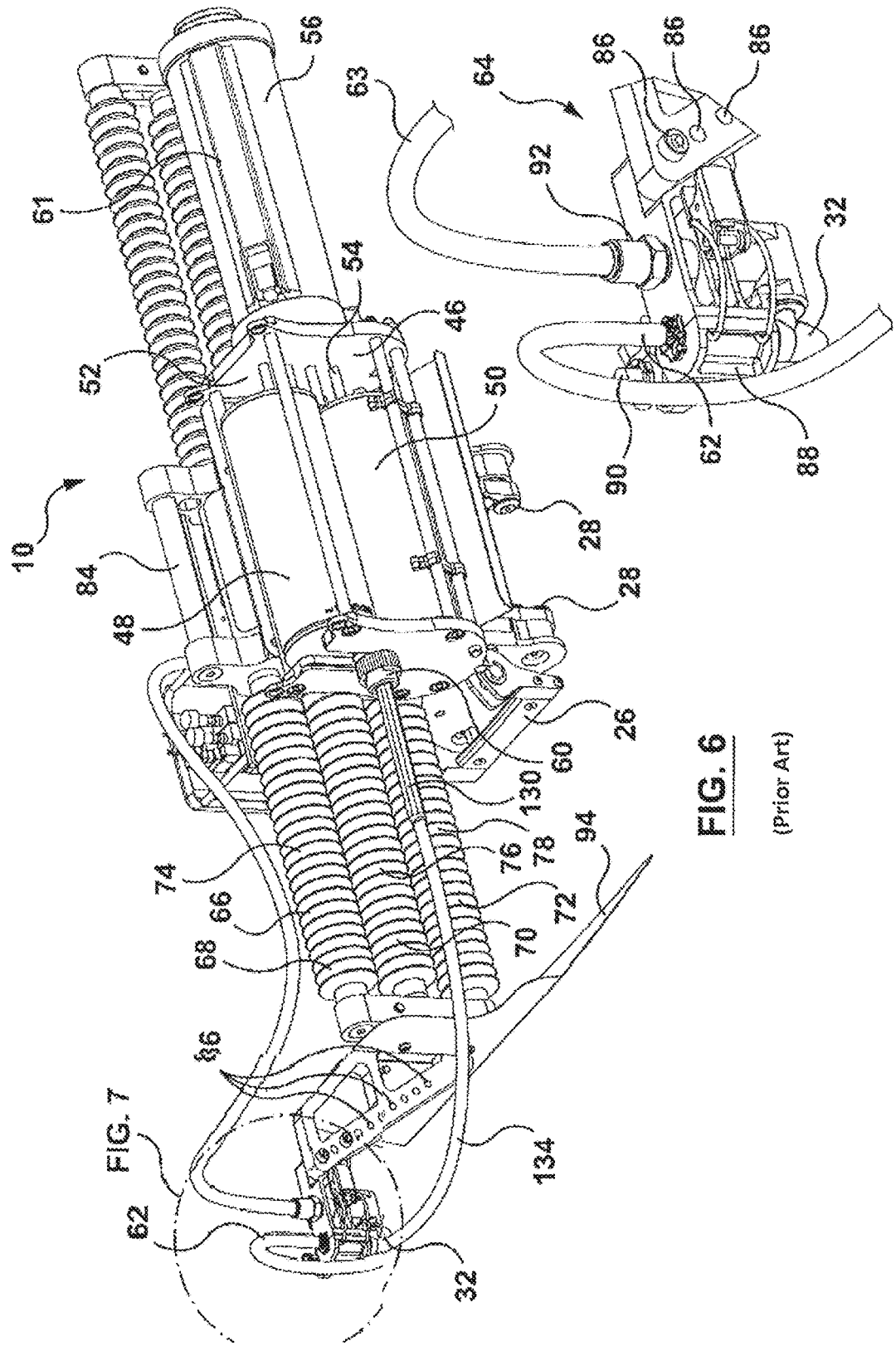

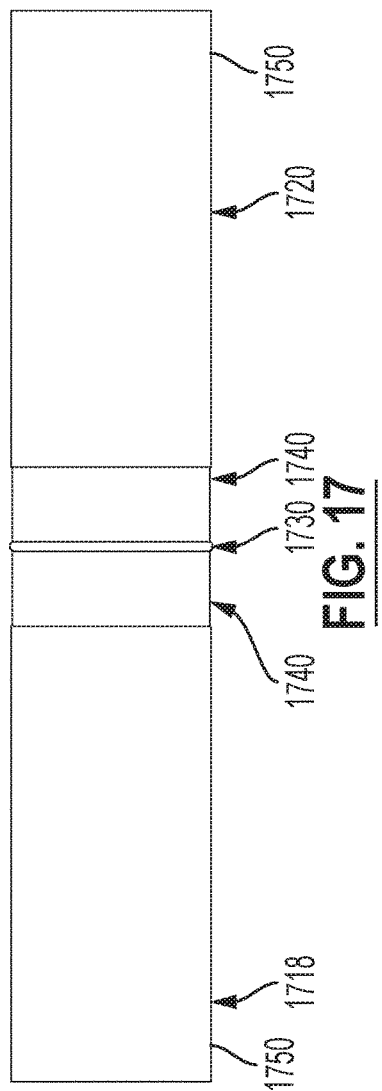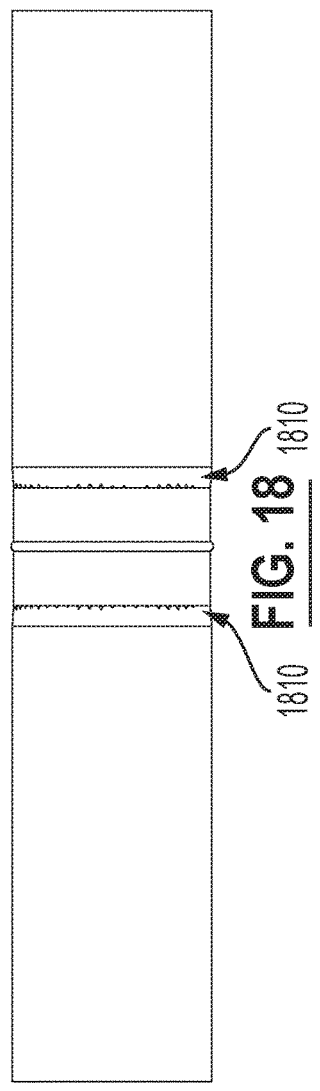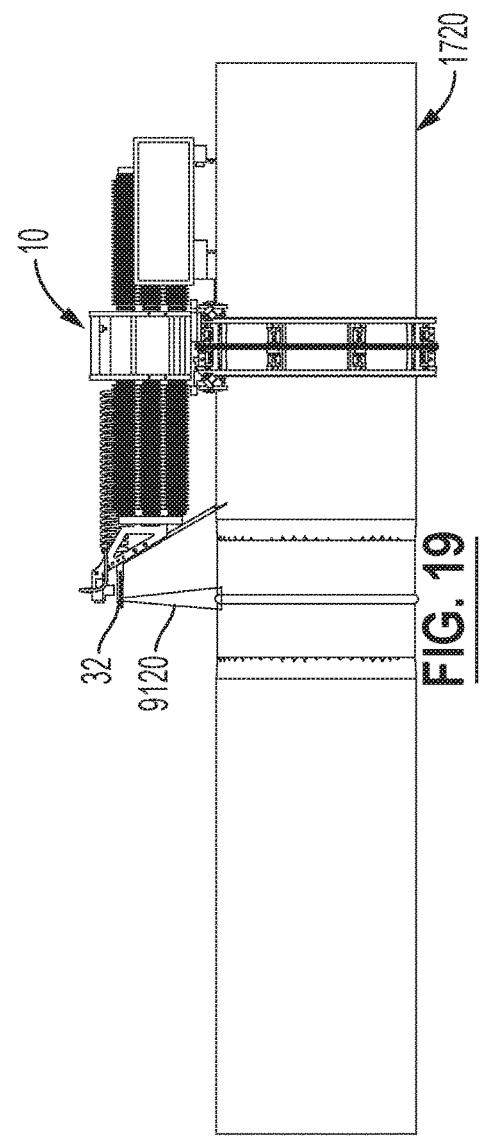

| Index # | Flow rate | Spray Pressure |
|---|---|---|
| 1 | Low | High |
| 2 | Nominal | Nominal |
| 3 | Nominal | Nominal |
| 4 | Nominal | Nominal |
| 5 | High | Nominal |
| 6 | Nominal | Nominal |
| 7 | Nominal | Nominal |
| 8 | Nominal | Nominal |
| 9 | Low | High |

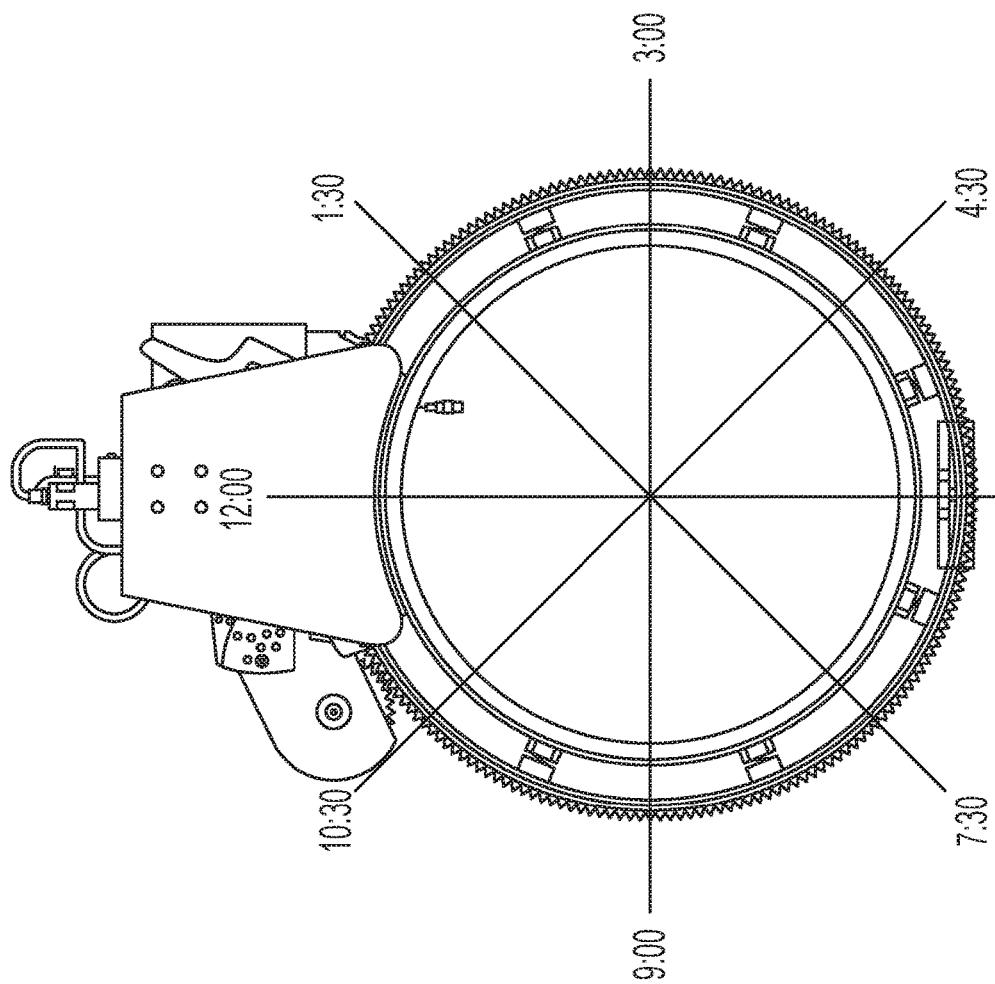

PIPELINE SPRAYER AND METHOD

BACKGROUND OF THE INVENTION

The present invention relates to an apparatus for coating pipes, particularly, to coating the exposed steel weld joint cutback area on oil and gas pipeline as it is being built.

Typically, oil and gas pipelines are formed from many lengths (typically 20, 40, or 60 feet) of steel pipe, attached by girth weld, end to end. The steel pipe lengths are coated, typically with a polyolefin coating, or a multi-layer coating comprising for example an epoxy first coat followed by a polyethylene or polypropylene top coat. This coating has multiple purposes, imparting corrosion and impact resistance to the pipe. Typically, the pipe lengths have an exposed region at each end of the pipe, where the steel is exposed and not coated. This exposed region is usually between 4 and 18 inches in length, and exists to facilitate girth welding the pipe end to the pipeline. When a pipe length is added to a pipeline, the exposed metal end is girth welded to the end of the pipeline (which is also exposed metal), producing a girth weld area with an adjacent uncoated region of pipe (the "cutback region"). This cutback region must be coated to prevent corrosion and provide impact resistance.

There are many competing technologies for coating the cutback region. One technology is to apply a shrink sleeve or wrap to the area. The shrink sleeve or wrap can be one, two, or multi-ply, but is often a two-ply structure comprising an adhesive layer applied to the pipe, and an external polyolefin layer. The sleeve or wrap can be heat shrunk to the cutback region using an exposed flame torch, or by using heating elements applied around the sleeve or wrap. Often, the exposed steel cutback region is epoxy coated, typically with a 150-300 micron primer epoxy layer, before the sleeve or wrap is applied.

Another technology for coating the cutback region is a one layer, stand alone, high-build epoxy coating, typically 500-1500 microns in thickness.

For both of the abovementioned, the coating is typically applied by mixing a two-part liquid mixture, typically a two-part polyurethane or epoxy coating supplied as two liquids which set chemically when mixed together, then applying it to a hot metal pipe manually, with a roller, brush, sponge or the like. Although this is a relatively inexpensive and simple way of applying the coating, it introduces user error, inconsistency in application thickness, and significant health and safety concerns due to the toxicity of the liquid coating and the intense heat of the pipe. It is difficult for a user to apply an even coating all around the surface of a pipe, especially when under the rigid time constraints applied when installing pipeline. Thus, the top and sides often receive a thicker layer of coating than the underside, which is undesirable.

Alternative, automated systems are known, for example, a high-pressure plural component spray unit such as the HydraCat™ fixed ratio mechanical proportioner (Graco, Minneapolis, Minn., USA) can be utilized to mix the two liquid components of the epoxy mixture, and simultaneously spray the mixture onto the field joint area. However, such hand-held spray units do not resolve the issues of user error, inconsistency in application thickness (such as overspray proximal to the user and/or underspraying in hard to reach areas), and often even greater health and safety concerns due to the airborne epoxy spray.

Automated spray systems have been developed.

U.S. Pat. No. 5,207,833, incorporated by reference, discloses a machine which can travel down a pipe applying a protective coating. The machine has a two-piece yoke which is fitted around the pipe, with each piece serving as a track on which a spray gun moves. The machine is not well suited for coating cut back regions at a girth weld, and has other significant disadvantages, including a requirement for flushing the spray apparatus with solvent between each use.

PCT patent publication WO01/32316A1, incorporated herein by reference, discloses a body for mounting on a pipe to be coated, with a spray gun mounted thereto. The spray gun is configured to rotate around the body to spray coating completely around the periphery of the pipe. The spray gun travels a full 360 degrees around the periphery of the pipe. The spray gun can be adapted for spraying a two-part coating, by having a mixing block in which the at least two parts are combined before being fed to the spray gun. Tubing is required between the mixing block and the gun, and the mixed coating in the mixing block and gun must be flushed after each coating operation utilizing a flushing solvent, which can be undesirable. The method disclosed includes clamping the body onto the pipe after mounting, directing the spray gun away from the pipe, turning the pipe nozzle to a jet position, flushing the spray gun with solvent, priming the spray gun with coating, stopping the flow of coating, turning the nozzle tip to a spray position, and turning the spray gun towards the pipe, before causing the spray gun to spray coating at the pipe. After coating the pipe, the spray gun must be flushed again to remove mixed coating. These numerous steps for the priming and pre-flushing of the spray gun before and after use are generally undesirable due to their complexity, their time requirements, and due to the use of undesirable solvents. In addition, the apparatus requires long and elaborate connection tubes (coating and solvent lines) running 50-100 feet from a main spray dosing unit to the application spray tip, to deliver coating and flushing solvent, since the coating and solvent reservoirs are not integrated with the spray gun, and hence do not rotate with it around the pipe. There are at least 3 lines (each part of the two-part coating having its own line, and the solvent line) but may be as many as 5 lines (recirculation hoses) which become wrapped and unwrapped as the spray gun rotates around the pipe. Typically, this requires 1-2 additional operators just to manage the line travel. It also limits the number of times the spray gun can rotate around the pipe—typically the rotation is limited to 360 degrees. The lines, and the dosing unit, operate at high pressure, often at least 1000 psi and higher, generally operated at 4000 psi delivered at the outlet of the pump, and with system operating maximum capabilities as high as 7250 psi, requiring large and cumbersome pressurization equipment to pressurize the large dosing unit containers of coating and the coating lines. The apparatus also requires an elaborate waste management system of receptacles, baffles and drains, mostly to manage the toxic solvent, and requires high pressure fluid due to the needs of the spray gun and the length of the lines, along with accompanying and multiple pressure regulators and valves. The apparatus that is affixed to the pipe is large, heavy, and unwieldy, and attaches to both ends of the cutback region—thus the apparatus must be designed and fabricated to be as wide as at least the largest cutback region it is designed to coat, plus portions on each end for affixing the apparatus to the pipe. Because, as discussed above, the exposed region is usually between 4 and 18 inches in length, the apparatus is typically over 24 inches in length and includes two portions, one on each side, that clamp to the pipe, resulting in a large and awkward device that is typically hoisted into place.

PCT patent publication WO 2011/162747, incorporated herein by reference, also discloses a plural component coating application system. The publication improves upon the previous systems by doing away with the toxic solvent priming and cleaning steps, using a high-pressure inert gas for priming and purging the spray gun and lines. Although the system removes the need for the undesirable solvent, it still has many of the disadvantages of the previous systems, including long, unwieldy lines for feeding the two-part coating to the spray gun, which is exasperated by the complex and unwieldy high pressure gas delivery system and its accompanying and multiple pressure regulators and valves. The system also clamps to pipe regions surrounding both ends of the cutback region, resulting in a device that is typically over 24 inches in length, and which must typically be hoisted into place.

U.S. Pat. No. 8,844,463, incorporated herein by reference, also describes a coating application system.

Hand-held, low pressure spray apparatus are also known, but rely on user skill to provide an even, complete coating of the pipe.

It would be desirable to have a relatively small, simple, solvent free, automated spray apparatus system for uniformly coating a cut-back area around a girth weld with a plural component coating.

SUMMARY OF THE INVENTION

According to one aspect of the invention is provided an apparatus for coating a girth weld and a cutback region surrounding said girth weld on a coated steel pipe, comprising: a frame having: a roller carriage configured for mounting to a track affixed proximal to said cutback region and circumferentially around said coated steel pipe, said roller carriage having powered circumferential travel means providing circumferential rotational travel of said support frame at least 350, preferably 360, most preferably infinitely, around said track; and an arm cantilevered laterally from said frame; said arm having a spray head region at an end of said arm distal to said frame; said arm having powered lateral travel means providing lateral travel of the spray head region relative to said frame, the distance of said lateral travel at least equal to the length of half of the cutback region; controllable means for spraying a mixed, multi-component liquid coating from the spray head region onto the cutback region to be coated; and a controller operatively linked to and controlling the powered lateral travel means, the powered circumferential travel means, and the means for spraying the mixed, multi-component liquid coating.

In certain embodiments, the powered circumferential travel means comprises a powered drive gear on the support frame, operatively connected to and displacing along a rack on the track.

In certain embodiments, the powered circumferential travel means also comprises an electric motor for powering the powered drive gear.

In certain embodiments, the powered drive gear is pneumatically powered.

In certain embodiments, the powered drive gear is hydraulically powered.

In certain embodiments, the controllable means for spraying a mixed, multi-component liquid coating from the spray head region onto the cutback region to be coated comprises: a cartridge carriage configured to receive at least one cartridge and optionally two or more than two cartridges, each said cartridge or cartridges containing one of the components of the multi-component liquid coating, or optionally more than one component of the multi-component liquid coating in separate compartments, wherein, when in use, the cartridge carriage contains at least one cartridge and at least two components of the multi-component liquid coating housed within said at least one cartridge; displacement means for displacing the at least two components of the multi-component liquid coating out of the cartridge or cartridges and into a mixer which mixes the at least two components to form the multi-component liquid coating, and therefrom through a spray nozzle attached, optionally by a multi-component liquid coating component hose, to said mixer; said spray nozzle affixed to the spray head region and configured to spray the multi-component liquid coating onto the cutback region when the apparatus is mounted to a track affixed proximal to said cutback region.

In certain embodiments, the cartridge or cartridges, the mixer, and/or the spray nozzle are disposable consumables.

In certain embodiments, the cartridge or cartridges may be refillable, for example, they may be continuously filled, from a low-pressure bulk supply of component.

In certain embodiments, the cartridge or cartridges, the mixer, and/or the spray nozzle are reusable. In certain embodiments, for example, where the cartridge or cartridges are refillable and re-usable, the mixer and/or the spray nozzle can be disposable consumables, which, in certain embodiments, allows the use of a low pressure bulk supply of component without the need for solvent-based cleaning of the system (since all components downstream of the mixing of the multi-component liquid are disposable).

In certain embodiments, the apparatus further comprises the spray nozzle.

In certain embodiments, the spray nozzle comprises a pressurized air input.

In certain embodiments, the apparatus further comprises a power source for the powered lateral travel means, the powered circumferential travel means, and/or the means for spraying the mixed, multi-component liquid coating.

In certain embodiments, the displacement means for displacing the at least two components is controlled by the controller.

In certain embodiments, the displacement means for displacing the at least two components comprises a piston for displacement of each of the components out of the cartridge or cartridges, and a cartridge gun for displacing the pistons.

In certain embodiments, the cartridge gun is selected from a pneumatic cartridge gun, an electric cartridge gun, and a hydraulic cartridge gun.

In certain embodiments, the arm comprises at least two, preferably three, shafts, linking the spray head region with the frame, and slidable relative to the frame.

In certain embodiments, the powered lateral travel means is a non-captive stepper motor on said frame, turning a lead screw on said arm, which in turn moves the arm relative to the frame.

In certain embodiments, the spray head region is laterally and/or transversely adjustable relative to the arm and frame.

In certain embodiments, the apparatus further comprises a control box wired to the controller, said control box having a user interface for operating and/or programming the apparatus.

In certain embodiments, the two components of the multi-component liquid coating comprise (a) an epoxy base and (b) an epoxy curing agent.

In certain embodiments, the cartridges are of an appropriate size to contain sufficient epoxy curing agent and/or epoxy base, respectively, for coating one cutback region.

In certain embodiments, the apparatus further comprises heating means for heating the cartridges, said heating means configured to travel with said reservoir frame.

In certain embodiments, the apparatus further comprises: at least two continuous component inlets each adapted to receive a high pressure line through which a component flows; a valve for controlling the flow of component from the component inlets into a mixer which mixes the components to form the multi-component liquid coating, and therefrom through a spray nozzle attached, optionally through a high pressure multi-component liquid coating hose, to said mixer; said spray nozzle affixed to the spray head region and configured to spray the multi-component liquid coating onto the cutback region when the apparatus is mounted to a track affixed proximal to said cutback region.

In certain embodiments, the apparatus further comprises: at least two continuous component inlets each adapted to receive a low pressure line through which a component flows; a valve for controlling the flow of component from each of the component inlets into an on-board reservoir, a mixer which mixes the components to form the multi-component liquid coating, and therefrom through a spray nozzle attached, optionally through a low pressure multi-component liquid coating hose, to said mixer; said spray nozzle affixed to the spray head region and configured to spray the multi-component liquid coating onto the cutback region when the apparatus is mounted to a track affixed proximal to said cutback region.

In certain embodiments, the apparatus further comprises the mixer, the high- or low-pressure multi-component liquid coating hose, and/or the spray nozzle.

In certain embodiments, the nozzle, the high- or low-pressure multi-component liquid coating hose, and/or the spray nozzle, are disposable consumables.

In certain embodiments, the nozzle, the high- or low-pressure multiple component liquid coating hose, and/or the spray nozzle are reusable.

In certain embodiments, only the nozzle and the mixer are disposable consumables.

In certain embodiments, the powered circumferential travel means provides variable, user selectable rotation speed.

In certain embodiments, the circumferential travel means provides unidirectional travel.

In certain embodiments, the circumferential travel means provides bidirectional travel.

In certain embodiments, the apparatus further comprises a plurality of wheels affixed to the roller carriage to facilitate circumferential travel of said frame around said pipe.

According to a further aspect of the invention is provided a method of coating a cutback region of a pipe, comprising: (a) affixing or clamping a track having a rack, circumferentially around an outer surface coating of said pipe, proximal to said cutback region; (b) mounting an apparatus as herein described to said track so that the circumferential travel means engages with the rack; (c) positioning the spray head region laterally within the cutback region of the pipe; (d) installing the at least one cartridge into the cartridge carriage, said at least once cartridge loaded with at least two of the components of the multi-component liquid coating; (e) priming the mixer and spray nozzle with multi-component liquid coating by displacing the components from the cartridge into the mixer and spray nozzle; (f) spraying the multi-component liquid coating out of the spray nozzle onto the cutback region of the pipe while rotating the apparatus around the pipe; (g) optionally displacing the spray head region laterally relative to the frame of the apparatus, while rotating the apparatus around the pipe or between rotation cycles, to spray the multi-component liquid coating onto the entirety of the cutback region, resulting in a relatively even coating of the multi-component liquid coating onto cutback region; wherein step (d) is done in any order relative to the other steps, and steps (a), (b), (c), (e) and (f) are done in the order herein provided.

In certain embodiments, the at least one cartridge is pre-heated before installation.

In certain embodiments the multi component liquid delivery flow rate is measured continuously during operation.

In certain embodiments, the method also includes providing pressurized air to the nozzle during the spraying step.

In certain embodiments, steps (e) and optionally (f) are computer controlled and automated.

According to a further aspect of the present invention is provided a method of coating a cutback region of a pipe, comprising: (a) affixing or clamping a track having a rack, circumferentially around an outer surface coating of said pipe, proximal to said cutback region; (b) mounting an apparatus as herein described to said track so that the circumferential travel means engages with the rack; (c) positioning the spray head region laterally within the cutback region of the pipe; (d) installing the high pressure component lines to the continuous component inlets; (e) priming the mixer and spray nozzle with multi-component liquid coating by displacing the components from the high pressure component lines into the mixer and spray nozzle; (f) spraying the multi-component liquid coating out of the spray nozzle onto the cutback region of the pipe while rotating the apparatus around the pipe; (g) optionally displacing the spray head region laterally relative to the frame of the apparatus, while rotating the apparatus around the pipe or between rotation cycles, to spray the multi-component liquid coating onto the entirety of the cutback region, resulting in a relatively even coating of the multi-component liquid coating onto cutback region; wherein step (d) is done in any order relative to the other steps, and steps (a), (b), (c), (e) and (f) are done in the order herein provided.

According to a further aspect of the present invention is provided a method of coating a cutback region of a pipe, comprising: (a) affixing or clamping a track having a rack, circumferentially around an outer surface coating of said pipe, proximal to said cutback region; (b) mounting an apparatus as herein described to said track so that the circumferential travel means engages with the rack; (c) positioning the spray head region laterally within the cutback region of the pipe; (d) installing the low pressure component lines to the continuous component inlets; (e) filling an on-board reservoir for each of the components with component from the low pressure component lines; (f) priming the mixer and spray nozzle with multi-component liquid coating by displacing the components from the on-board reservoirs into the mixer and spray nozzle; (f) spraying the multi-component liquid coating out of the spray nozzle onto the cutback region of the pipe while rotating the apparatus around the pipe; (g) optionally displacing the spray head region laterally relative to the frame of the apparatus, while rotating the apparatus around the pipe or between rotation cycles, to spray the multi-component liquid coating onto the entirety of the cutback region, resulting in a relatively even coating of the multi-component liquid coating onto cutback region; wherein steps (d) and (e) are done in any order relative to the other steps, for example, step (e) being done continuously; and steps (a), (b), (c) and (f) are done in the order herein provided.

BRIEF DESCRIPTION OF THE DRAWINGS

FIG. 6 is the rear perspective view of the apparatus of FIG. 1.

FIG. 7 is an enlarged view of the region of FIG. 6 depicted with an "A".

FIG. 17 shows a cutback region of a welded pipe to be coated by the apparatus of FIG. 1.

FIG. 18 shows a cutback region of a welded pipe with dressing to be coated the apparatus of FIG. 1.

FIG. 19 shows an apparatus according to FIG. 1 strapped to the welded pipe according to FIG. 18.

FIG. 24 shows a longitudinal view of the apparatus according to FIG. 1 strapped to the welded pipe according to FIG. 18.

DETAILED DESCRIPTION OF THE PREFERRED EMBODIMENTS

Described is a relatively small, simple, optionally solvent-free, automated spray apparatus system useful for uniformly coating a cut-back area around a girth weld with a plural component coating, such as a two-part polyurethane or epoxy. The apparatus is in the form of a "bug" which is configured to, and can be mounted on a standard, or optionally on a custom manufactured, track which is clamped to the outer coating of a pipe. The apparatus may be mounted on a single track.

Figure 1:
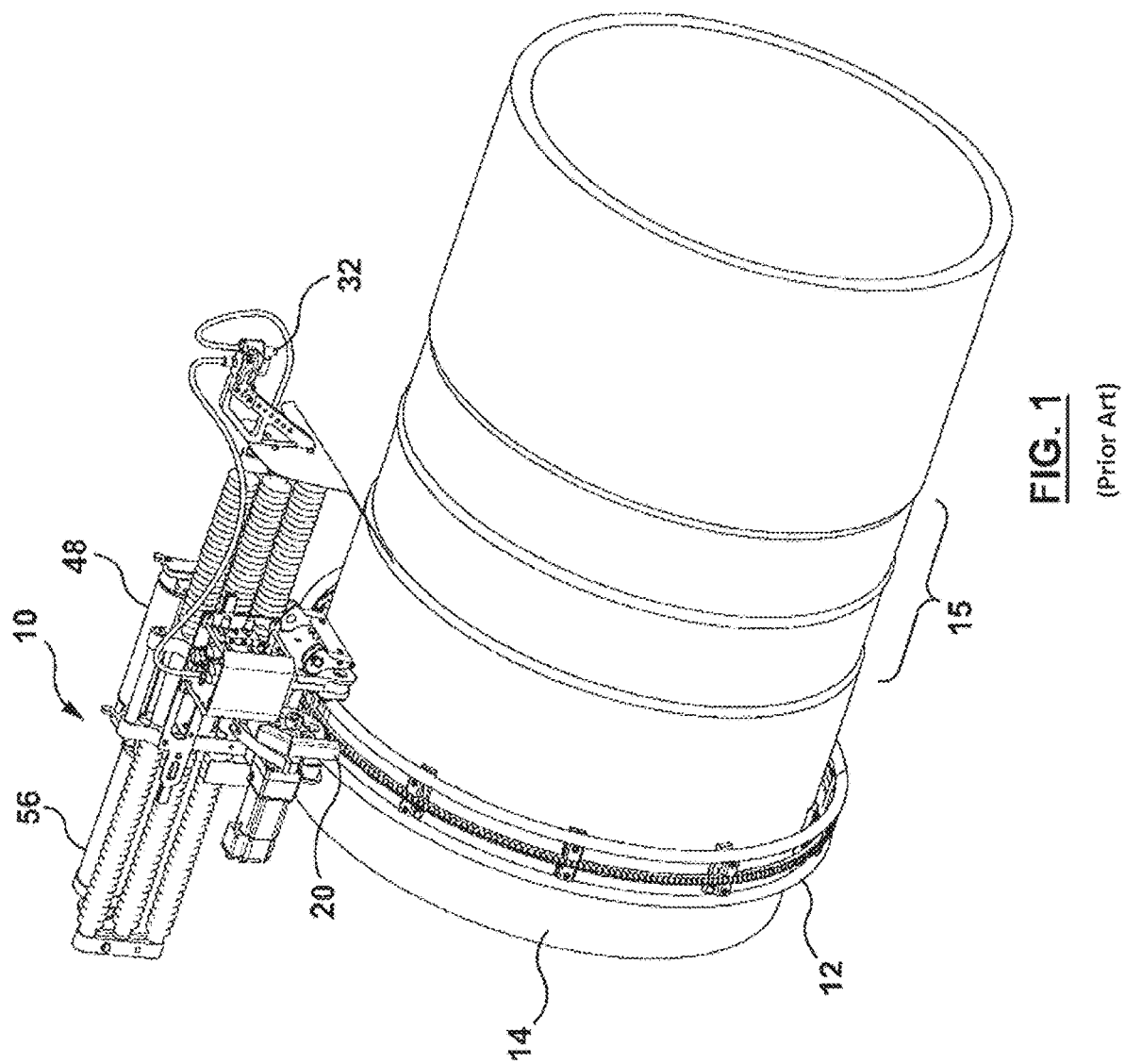
FIG. 1 is a front perspective view of an apparatus according to the prior art, affixed to a pipe at a girth weld.
Figures 2, 3:
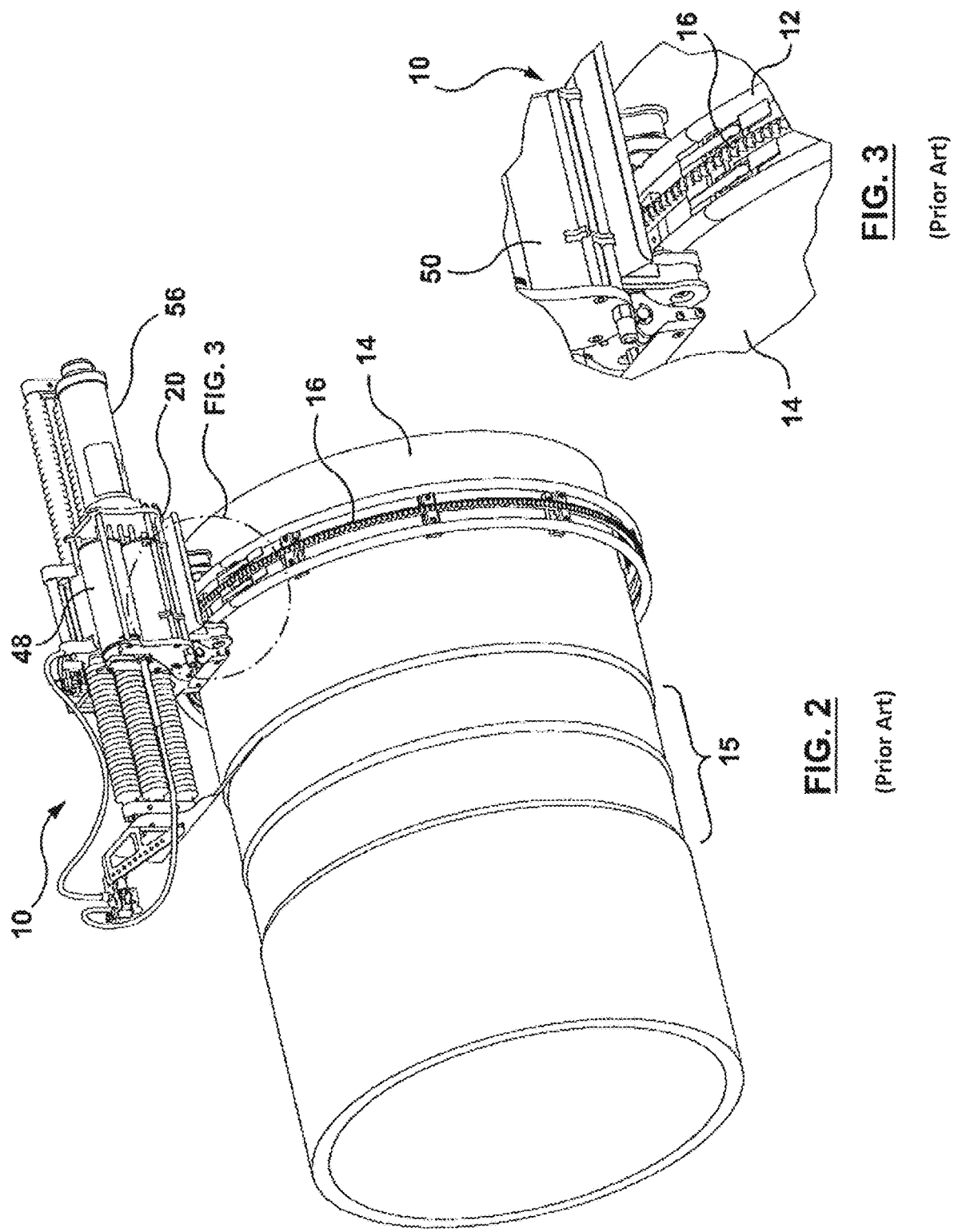
FIG. 2 is a rear perspective view of the apparatus of FIG. 1.
FIG. 3 is an enlarged view of the region of FIG. 2 depicted with a "B".

As shown in FIGS. 1-3, apparatus 10 is configured to mount onto, and rotate around, track 12 which can be clamped to pipe 14 proximal to cutback region 15. Track 12 comprises a rack 16 which is operably connected to a drive gear 18 on the frame 20 of apparatus 10. This configuration provides the ability for apparatus 10 to travel in a motorized, controllable manner, around track 12 and thus around the circumference of the pipe 14 in a rack and pinion arrangement. Apparatus 10 also comprises spray nozzle 32 which is cantilevered over the cutback region 15 of the pipe 14.

Figure 4:
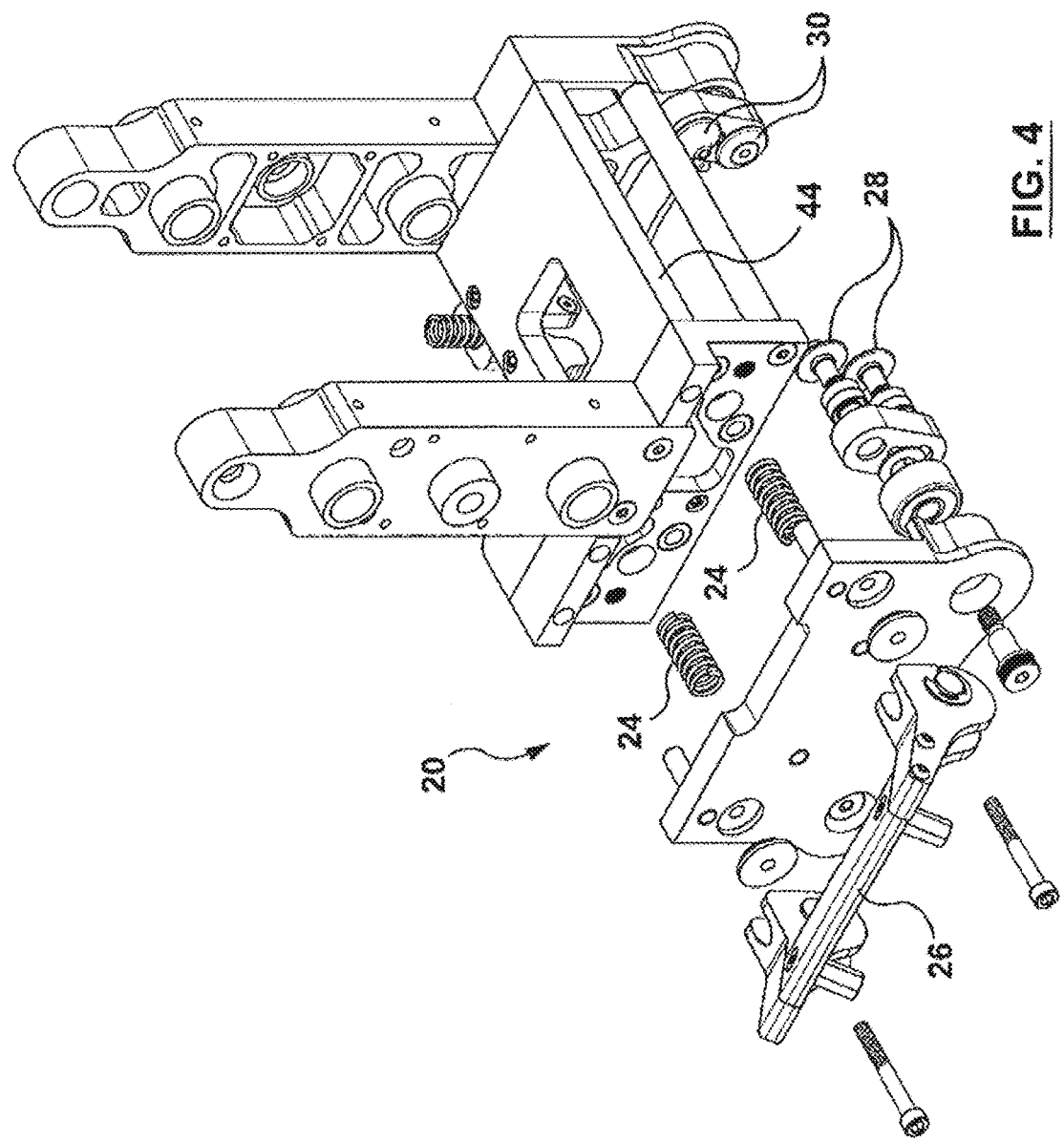
FIG. 4 is an isolated, exploded, perspective view of the frame of the apparatus according to the prior art.

FIG. 4 is an isolated, exploded, perspective view of the roller carriage 44 situated on the frame 20 of apparatus 10 of the present invention. Frame 20 comprises clamping wall 22 which is spring biased with springs 24 to an 'open' position, and clamped into a 'closed' position utilizing clamping cam handle 26. In the 'open' position, the frame 20 may be mounted onto the track 12 and affixed thereto by moving lever 26 such that clamping wall 22 moves to a closed position. Track rollers (28, 30 shown) allow for displacement of the frame 20 around the track 12.

Figure 5:
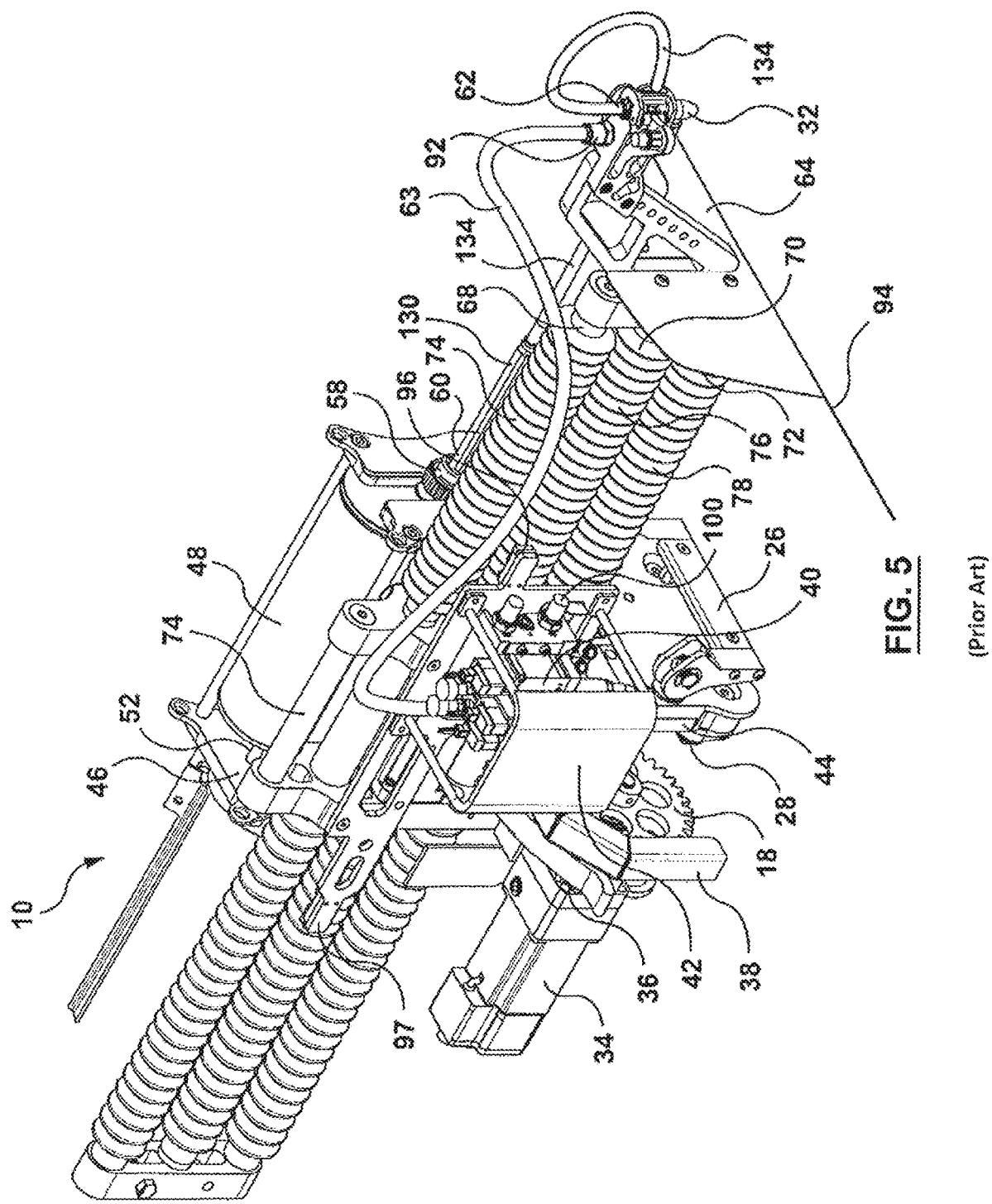
FIG. 5 is a front perspective view of one embodiment of an apparatus according to the prior art.

FIGS. 5-7 show one embodiment of the apparatus of the present invention, a cartridge-based apparatus. Shown is drive gear 18 connected to servo motor 34 and gear head (not shown), through drive engagement cam 36. The servo motor 34 is utilized to turn the drive gear 18, to provide displacement of apparatus 10 around the circumference of the pipe. Servo motor 34 is controlled by a programmable controller 40 which can be programmed to provide automated displacement of apparatus 10 around the circumference of the pipe in a desired direction and speed. Also shown, though optional, is drive gear guard 38, which protects the user from injury due to the turning drive gear 18, and protects the rack and pinion mechanism of the drive gear 18 and rack from foreign objects or from spray back of the plural component coating (for example, epoxy). Electronics protective guard 42 can be a plastic or metal plate which protects the key electronic components of apparatus 10, such as the controller 40, from damage from foreign objects or plural component coating spray back. It would be readily understood to a person of skill in the art that it would be desirable to prevent plural component coating from adhering to the drive gear 18, the rack, or the electronic components of apparatus 10.

Apparatus 10 also has carriage 46 configured to receive cartridges 48, 50. Cartridges 48, 50 may be two separate cartridges, each containing one of the plural components of the coating spray, or, as shown, may be a single cartridge having two segregated bodies each containing one of the plural components of the coating spray. As shown, and its most common embodiment, apparatus 10 is configured to apply a coating spray having two components, however, it would be understood to a person of skill in the art that if a plural component coating spray having more than two components was desired, the cartridge carriage 46 could easily be configured to receive more than two cartridges, or alternatively, a single cartridge having more than two segregated bodies each containing one of the plural components of the coating spray. Cartridge pistons 52, 54 are configured to enter cartridges 48, 50, and are connected to cartridge gun 56, which is pneumatically or electrically actuated and displaces cartridge pistons 52, 54, thereby displacing the components contained in the cartridge 48, 50 through cartridge nozzles 58, 60. When cartridge pistons 52 and 54 are electrically actuated, that mechanism may employ an electric motor (not shown). The electric motor in conjunction with a screw or rack and pinion mechanism, may translate the rotational motion of the electric motor into linear motion of the pistons. In use, cartridge nozzles 58, 60 are attached to a static mixer having mixing area 130, which is in turn, optionally through a hose 134, attached to spray nozzle 32 at hose adapter 62.

The actuation of cartridge gun 56 is electronically controlled through controller 40, programmable, and is coordinated with the movement of apparatus 10 around the pipe 14 and the movement of the spray head 64 relative to the frame 20.

The ratio of components displaced out of the cartridge nozzles 58, 60 can be controlled through the difference of diameter of the bodies of the cartridges 48, 50, or through a difference in the displacement speed of cartridge pistons 52, 54.

In certain embodiments, the rate at which the components are delivered to the nozzle is measured by a linear position sensor 61, attached to cartridge gun 56. This sensor may be in the form of a rotary potentiometer, linear potentiometer or non-contact type sensor such as a magnetic potentiometer or optical distance transducer.

In certain embodiments, the static mixer 130 and hose 134 which connects the static mixer 130 to the spray nozzle 32 are disposable components, reducing the requirement for flushing hoses and solvents. In certain embodiments, the cartridges 48, 50 are pre-loaded with components and disposable. For example, the cartridges 48, 50 can be pre-loaded with the desired amount of components to coat one cut back region, and can be replaced for each cut-back region being coated. In certain embodiments, the cartridges 48, 50 are a Sulzer DP 1L cartridge (Sulzer, Switzerland) and the static mixer 130 is a Sulzer DP static mixer/flex hose assembly.

In other embodiments, the cartridges are refillable from a low-pressure bulk supply of component. Such re-filling can be done between jobs, or it can be done in a continuous manner while the apparatus is in use. In these embodiments, the cartridges may be re-utilized. In such embodiments, the cartridges are configured to receive low pressure component lines (not shown) from a plural component coating spray delivery system (not shown) which may, for example, be a continuous delivery system, with each cartridge receiving, through its own component inlet, a different component of the plural component coating. A valve can be used to control the flow of components through the continuous component inlets. In some embodiments, the low-pressure flow of component is continuous, in other embodiments, the low-pressure flow of component is automatically controlled, while in use, based on the amount of component left in the cartridge. In such embodiments, the component delivery system is attached to the apparatus through low pressure conduits while the apparatus is in use. In other embodiments, the low-pressure flow of component is controlled by the user, for example, by re-filling the cartridges between coating jobs. For example, in some embodiments, the cartridge is re-filled between coating jobs, with a low-pressure flow of component, while the user replaces the disposable mixer and nozzle. In such embodiments, in some exemplifications, the apparatus is attached to the component delivery system (through low pressure conduits) while the apparatus is not in use, for example, between coating jobs.

Apparatus 10 also has sliding arm 66 comprising three slidable shafts 68, 70, 72 each covered by protective bellows 74, 76, 78, respectively. Spray head 64 is connected to the distal end of sliding arm 66 and thus cantilevered over the cutback region 15. It would be appreciated that although three slidable shafts 68, 70, and 72 are shown, any configuration of slidable elements could comprise sliding arm 66. Sliding arm 66 can slide relative to the frame 20 and is displaced by a non-captive stepper motor 80 and lead screw 82 controlled by controller 40 through a multi-channel pneumatic valve body and regulation/velocity control.

Apparatus 10 has a carrying handle 84 which is adaptable for a hoist ring. However, due to its size and weight, apparatus 10 can easily be carried by one user utilizing the carrying handle 84.

The height and position of spray head 64 is adjustable by affixing it at one of spray head attachment points 86. The spray angle can also be adjusted by rotating the spray head 64 relative to the arm 66. Spray head 64 comprises spray nozzle 32 operatively connected to hose adapter 62, and housed in nozzle cradle and quick change adapter 88 for rapidly changing the spray nozzle 32 when required. Spray head 64 optionally, and as shown, also comprises laser alignment module 90 which provides visual identification to the operator of the central target of the spray pattern and facilitates quick alignment of the apparatus during set up to a location on the pipe, typically by aligning the laser "dot" emitted from the laser alignment module 90 to the weld bead at the center of the field joint, and air atomization input adapter 92 which provides pressurized air to the spray nozzle 32. Providing pressurized air through air hose 63 to the spray nozzle 32 allows the pressure of the components to remain low as they are displaced from cartridges 48, 50 to the spray nozzle 32, while still having sufficient pressure to provide a fine spray as the components are released from spray nozzle 32 onto the pipe to be coated.

Also shown in FIGS. 5 and 6 is spray shield 94, which protects the body of apparatus 10, as well as the track 12, from spray back of the coating spray when in use.

Apparatus 10 comprises proximity sensors 96, 97, which are inductive type proximity sensors with both safety and accuracy function. The proximity sensors 96, 97 are able to detect when the sliding arm 66 has reached the end of its lateral travel in both directions. The proximity sensors 96, 97 are utilized to stop movement, and prevent unwanted forces from developing in the powertrain and/or drivetrain of the linear stepper motor. For accuracy, the front proximity sensor 96 is used in a homing procedure to detect the "home" position of the lateral slide of the arm—when the arm is fully unextended, the front proximity sensor 96 sets the absolute position of the axis as zero in the controller, then indexes all future positions to this "home" position. As would be understood by a person of skill in the art, this function could equally be provided by rear proximity sensor 97.

Apparatus 10 also comprises umbilical electrical connector 100 which provides an electrical and electronic connection from apparatus 10 controller 40 to an external power source (not shown), and/or an external user interface (not shown) or external processor (not shown). Umbilical electrical connector 100 also provides power to drive the servo motor 34, and for the displacement of the sliding arm 66 and/or the cartridge gun body 56/cartridge piston 54 in embodiments where those components are electrically driven. In embodiments where the displacement of the sliding arm 66 and/or the cartridge gun body 56/cartridge piston 54 is pneumatic, apparatus 10 also comprises air quick connect 98 which allows for easy connection of a pressurized air hose (not shown).

In certain embodiments, and as shown in FIGS. 5-7, apparatus 10 weighs less than 50 lbs, preferably less than 34 lbs, and is thus easily transportable by one person. Track 12 as shown in FIGS. 1 and 2 weighs about 35 lbs and is therefore also easily transportable by one person.

Figure 8:
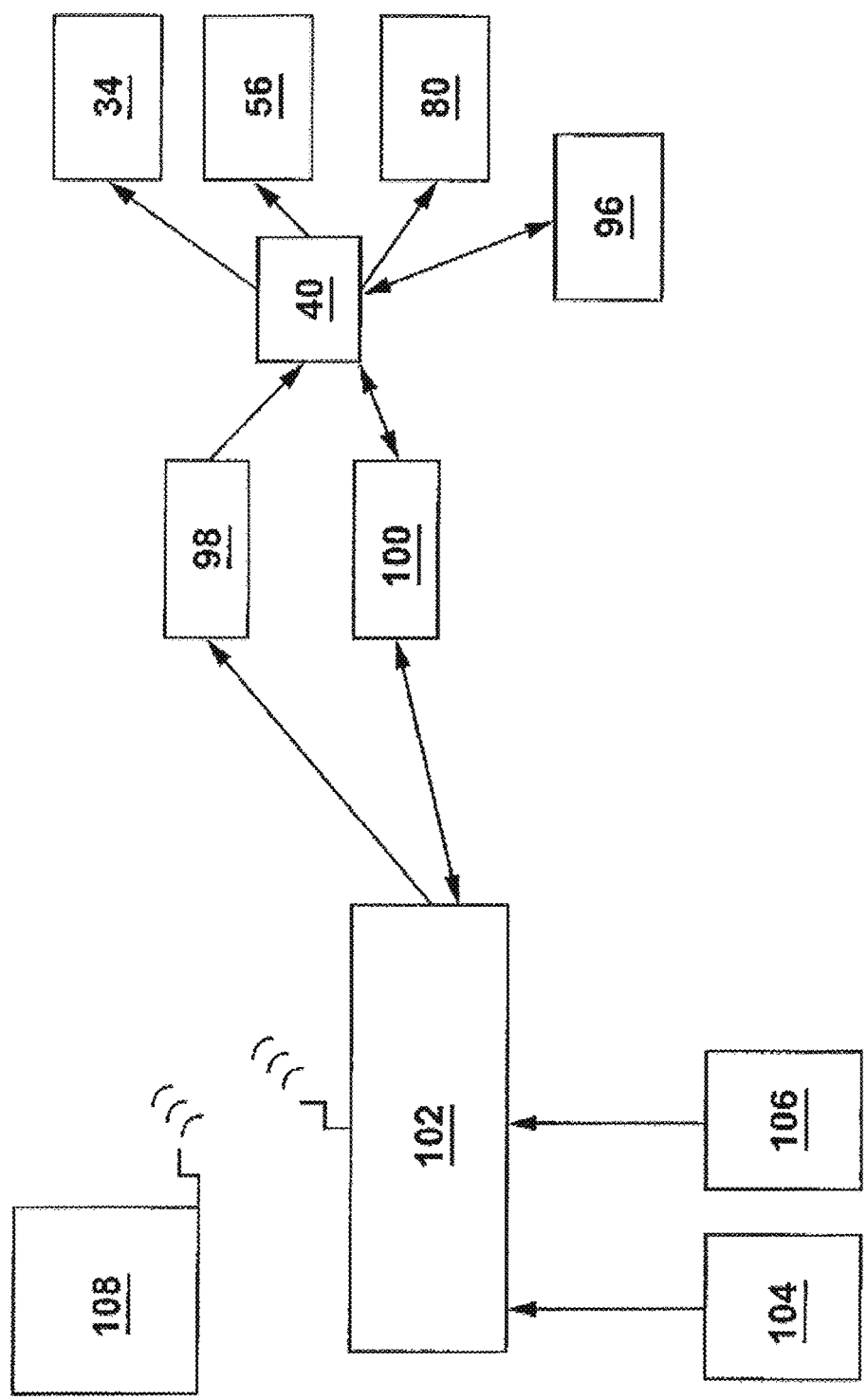
FIG. 8 is a schematic of certain functional elements of an apparatus according to the prior art, connected to a control box.

In certain embodiments, and as shown in part in FIGS. 5-7 and shown schematically in FIG. 8, the umbilical electrical connector 100 is connected to a control box 102 which provides 5 amp, 240 V power from a power source 104, and compressed air at 90 psi<15 SCFM from compressed air source 106 to controller 40. The controller controls servo motor 34, cartridge gun body 56 and stepper motor 80, providing both power and, where appropriate, compressed air, and controls and receives information from proximity sensor 96 and linear position sensor 61. The control box 102 can be controlled, and programmed, by a user using wireless control pendant 108 which is wirelessly connected to the control box 102. Typically, the control box 102 weighs about 50 lbs, though this weight may be brought down in further iterations of the control box; the umbilical cable (not shown) which connects the control box 102 to apparatus 10 through air quick connect 98 and umbilical electrical connector 100 typically weighs about 15 lbs.

In certain embodiments, and as shown in FIGS. 16A-16F, the control box 102 is preconfigured into a field robust rack 103 that includes all components for managing electrical safety, communications, digital controls, programming and air preparation. Programming and operation is managed through an operator Human Machine Interface (HMI) 154. Critical operator interface buttons and signals are available on the front face 156 of the control panel. The enclosure is environmentally protected and controlled with an integral air conditioning unit 158. The supply compressed air is conditioned to remove water mist and particulates with filters 160 and dehumidified with a membrane air drier 162. The air pressure is regulated with a regulator 164 and preheated to a specific supply temperature by a compressed air heater 166. The final temperature of the air is measured with a temperature sensor 167. The umbilical cable air quick connect 98 and electrical connector 100 connect to standard interfaces 168 and 152 respectively.

Figure 9:
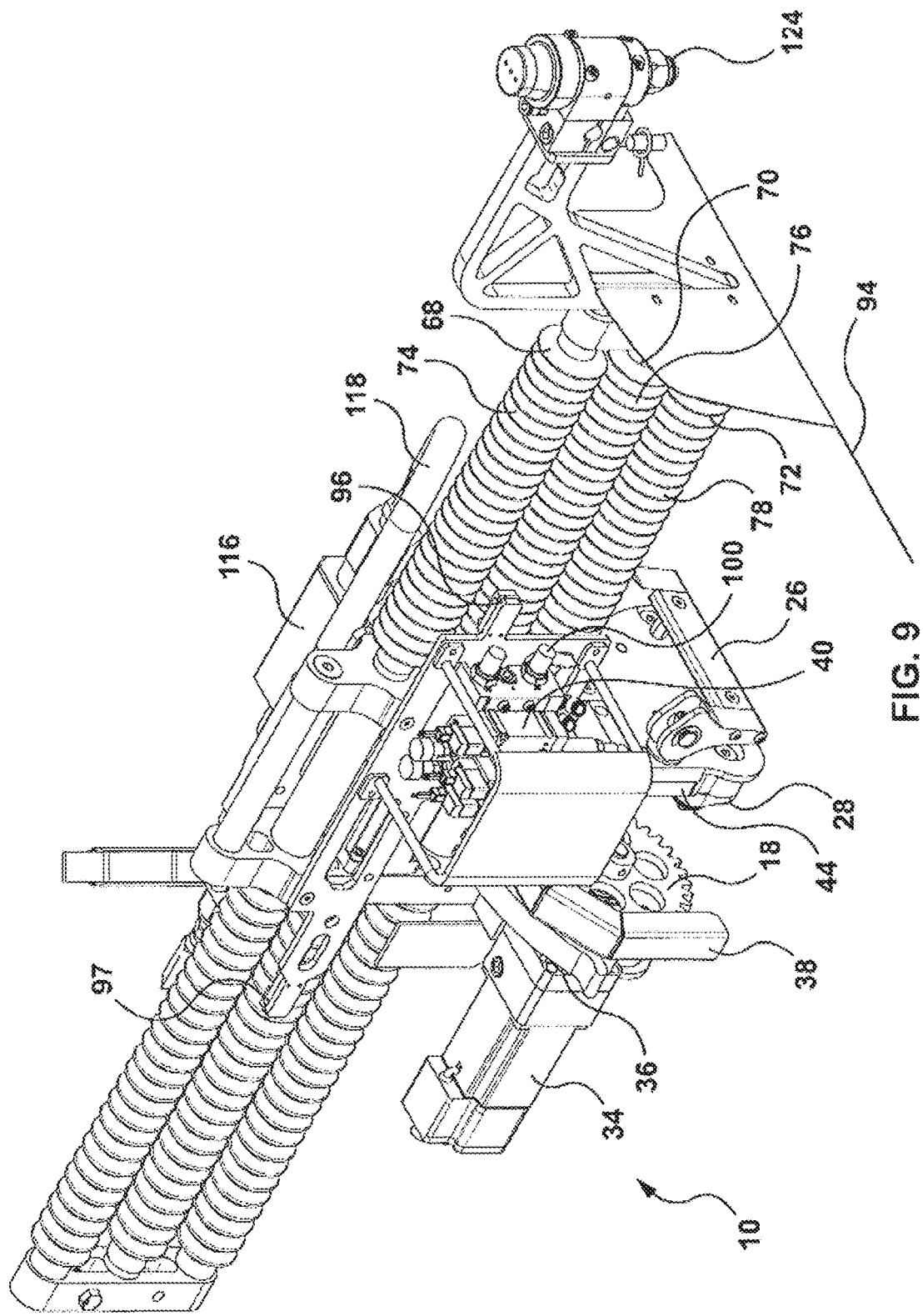
FIG. 9 is a front perspective view of a further embodiment of an apparatus according to the prior art.
Figure 10:
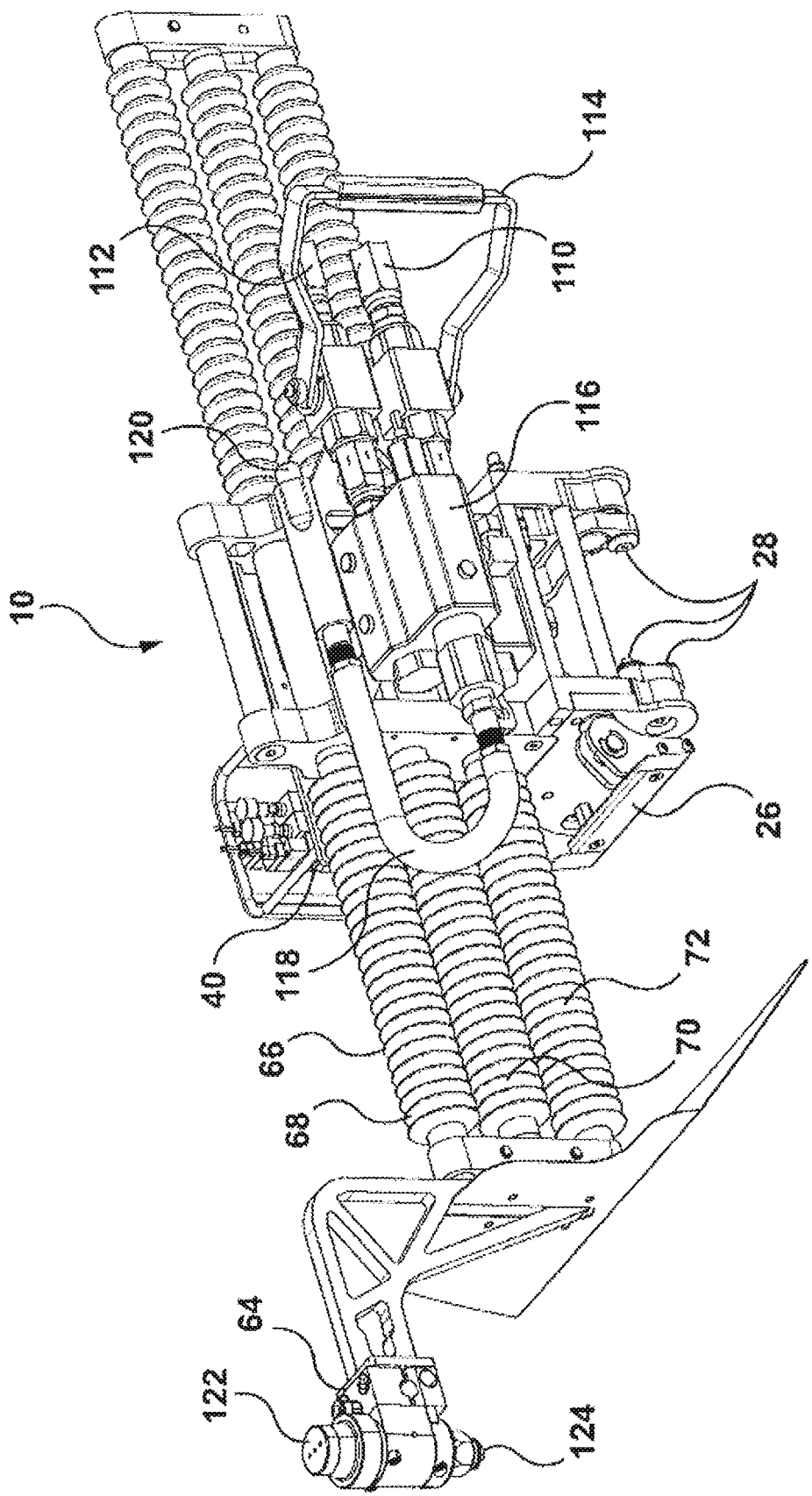
FIG. 10 is the rear perspective view of the apparatus of FIG. 9.

A further embodiment of the apparatus is shown in FIGS. 9 and 10, with like parts labelled similarly to the apparatus of FIGS. 5-7. Apparatus 10 differs from that of FIGS. 5-7 in that it is configured for continuous delivery, rather than cartridge-based delivery of the plural components of the coating spray. Continuous delivery plural component systems are generally fully contained, commercially available, systems (available for example, from GRACO, AIRTECH, BINKS or WIWA) that include fluid component preheating and storage, component pressurization, component mixing and final delivery, and optionally management of unused components return to storage. These systems may also include, often as a separate system, a tertiary component (solvent) management that is used to clean out the passageways of the system. In all notable commercially available systems, the principal operating power driving the component delivery is derived from compressed air. The compressed air drives proportioned hydraulic rams to pressurize the components to high pressures and in the correct ratio.

Similarly, to the apparatus of FIGS. 5-7, apparatus 10 is configured to mount onto, and rotate around, track 12 which can be clamped to pipe 14 proximal to cutback region 15. Apparatus 10 is able to travel in a motorized, controllable manner, around track 12 and thus around the circumference of the pipe 14 in a Vack and pinion' arrangement. Drive gear 18 connected to servo motor 34 and gear head (not shown), through drive engagement cam 36. The servo motor 34 is utilized to turn the drive gear 18, to provide displacement of apparatus 10 around the circumference of the pipe. Servo motor 34 is controlled by a programmable controller 40 which can be programmed to provide automated displacement of apparatus 10 around the circumference of the pipe in a desired direction and speed. Also shown, though optional, is drive gear guard 38, which protects the user from injury due to the turning drive gear 18, and protects the rack and pinion mechanism of the drive gear 18 and rack from foreign objects or from spray back of the plural component coating (for example, epoxy). Electronics protective guard 42 can be a plastic or metal plate which protects the key electronic components of apparatus 10, such as the controller 40, from damage from foreign objects or plural component coating spray back. It would be readily understood to a person of skill in the art that it would be desirable to prevent plural component coating from adhering to the drive gear 18, the rack, or the electronic components of apparatus 10.

Unlike the apparatus of FIGS. 5-7, the apparatus of FIGS. 9 and 10 does not have a cartridge carriage configured to receive cartridges. Instead, it is configured to be connected to off-the-shelf continuous delivery plural component coating spray systems. Continuous delivery plural component coating systems are available from various venders, such as GRACO, AIRTECH, BINKS and WIWA, and typically provide high pressure two component epoxies.

Thus, the apparatus of FIGS. 9 and 10 comprises continuous delivery component inlets 110, 112, which are configured to receive high pressure component lines from the plural component coating spray continuous delivery systems (not shown), with each continuous component inlet 110, 112, receiving a different component of the plural component coating. Quick release handle 114 allows for rapid connection and separation of the high-pressure component lines to apparatus 10. A valve 116, which may be hydraulic, electric, or, as shown, pneumatic, controls the flow of the components from component inlets 110, 112 to optionally disposable mixer 118, through mixer outlet 120 and into a high pressure, optionally disposable, tube (not shown) which is connected to spray inlet 122 which is, in turn, operatively connected to spray nozzle 124. One advantage of apparatus 10 over other plural component coating spray continuous delivery systems may be the size and weldability of the present apparatus 10, which is much lighter, easily carried and attached to a pipe by one user, and thus safer to use. A second advantage, however, is that in certain optional embodiments, all parts of the apparatus through which flow mixed components are disposable. Thus, all parts of the apparatus that, in a traditional continuous delivery system, would require significant cleaning, flushing, and solvent use, can be disposable and easily user replaced. Even if non-disposable components are used, they are easily removed from apparatus 10, for cleaning and flushing. This is much more convenient, and can be more environmentally friendly, than flushing plural component coating out of apparatus parts using (often toxic) solvents in the field.

As would be understood by a person of skill in the art, the apparatus of FIGS. 9-10 could still be cleaned and flushed in a traditional manner, by releasing the high pressure component lines (not shown) connected to the plural component coating spray continuous delivery systems (not shown) utilizing quick release handle 114, and replacing them with high pressure cleaning lines (not shown) configured to release solvent into apparatus 10.

The actuation of actuator 116 is electronically controlled through controller 40, programmable, and is coordinated with the movement of apparatus 10 around the pipe 14 and the movement of the spray nozzle 124 relative to the frame 20.

The ratio of components displaced can be controlled through use of different pressure lines to apparatus 10, or through having a separate actuator 116 for each high-pressure component line.

Although not shown in FIGS. 9 and 10, it would be appreciated that the apparatus may also have an adjustable spray head, and multiple spray head attachment points, similar to that of the apparatus of FIGS. 5-7.

Apparatus 10 has a carrying handle 84 which is adaptable for a hoist ring. However, due to its size and weight, apparatus 10 can easily be carried by one user utilizing the carrying handle 84.

Figure 11:
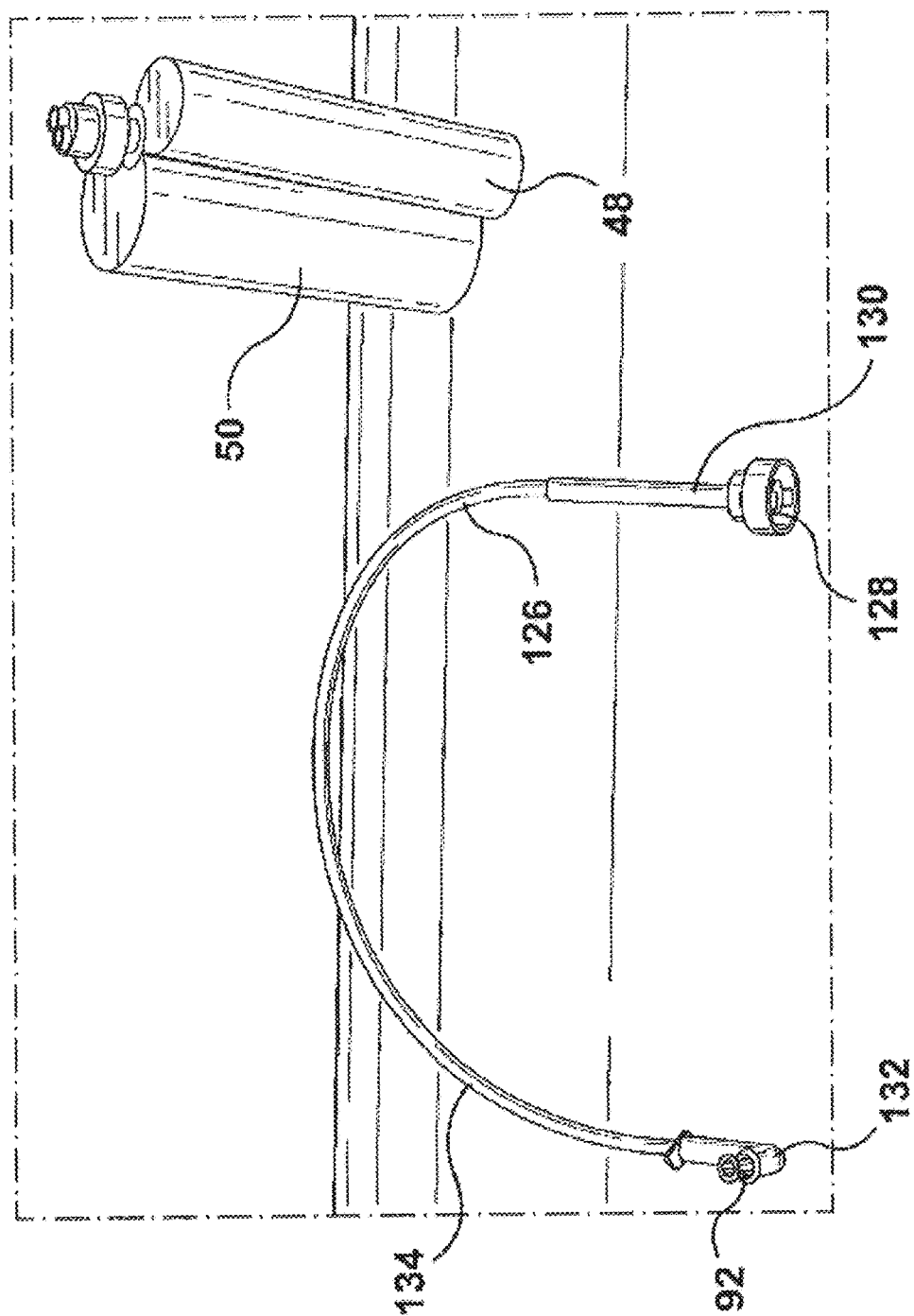
FIG. 11 is a photo of a disposable mixer and cartridge, shown in isolation, for use in the apparatus of FIG. 5.

FIG. 11 shows a photograph of cartridge 48, 50 in isolation, for use in the apparatus of FIGS. 5-7. Cartridge 48, 50 is mounted into cartridge carriage 46 as shown in FIGS. 5-7. As shown, cartridge 48 and cartridge 50 are actually housed in a single, plastic, bicylinder; metal or other materials may also be used, two separate cartridges may also be used. As shown, cartridge 48 has a larger diameter than cartridge 50, and contains (as the component) an epoxy, whereas cartridge 50 contains (as the component) an associated curing agent.

FIG. 11 also shows static mixer 126 in isolation, for use in the apparatus of FIGS. 5-7. Static mixer 126 has compound inlet 128 for connection to cartridge nozzle 58, 60, a mixing area 130 which mixes the two components together, and hose 134 for transporting the mixed components to the spray nozzle 32. The mixer 126 shown in FIG. 11 is slightly different than that which would be used with the apparatus of FIGS. 5-7, in that the mixer 126 comprises a built-in spray nozzle 132 and air atomization input adapter 92. Accordingly, the end of the mixer 126 can simply be clipped into the arm of the apparatus, utilizing quick change adapter 88. The advantage of utilizing an "all in one" mixer 126, comprising a built-in spray nozzle 132, like the one shown in FIG. 11, is that the entire assembly is disposable, which eliminates the need for cleaning spray nozzle 32. In alternative embodiments, such as that shown in FIG. 5-7, spray nozzle 32 is a separate element, which may be removed for cleaning by utilizing quick change adapter 88. As would be appreciated, the apparatus of FIG. 5-7 is configured so that a separate component spray nozzle 32 such as that depicted in FIGS. 5-7 can be interchanged with a built-in component spray nozzle 132 such as that depicted in FIG. 11.

Figure 12:
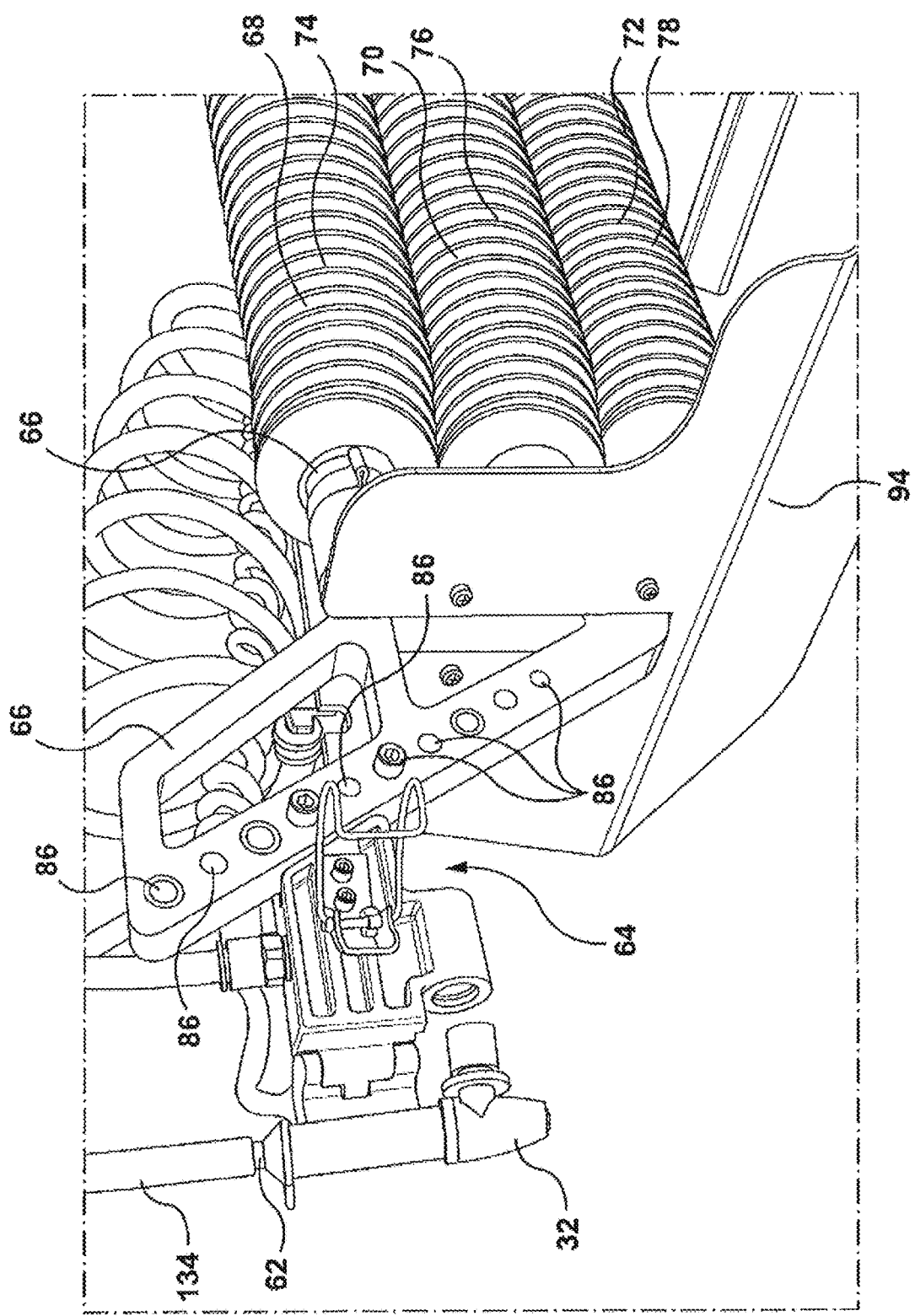
FIG. 12 is a photo close-up of the spray head of an apparatus generally similar to that of FIG. 6.

FIG. 12 is a photograph close-up of the spray head 64 of a further embodiment of apparatus 10. FIG. 12 clearly shows sliding arm 66 comprising three slidable shafts 68, 70, 72 each covered by protective bellows 74, 76, 78, respectively. Spray head 64 is connected to the distal end of sliding arm 66. Height and position of spray head 64 is adjustable by affixing it at one of spray head attachment points 86. The spray angle can also be adjusted by rotating the spray head 64 relative to the arm 66. Spray head 64 comprises spray nozzle 32 operatively connected to hose adapter 62, which is in turn connected to component hose 134. Spray head 64 comprises air atomization input adapter 92 which provides pressurized air to the spray nozzle 32. Also shown is spray shield 94, which protects the body of apparatus 10, as well as the track 12, from spray back of the coating spray when in use.

Figure 13:
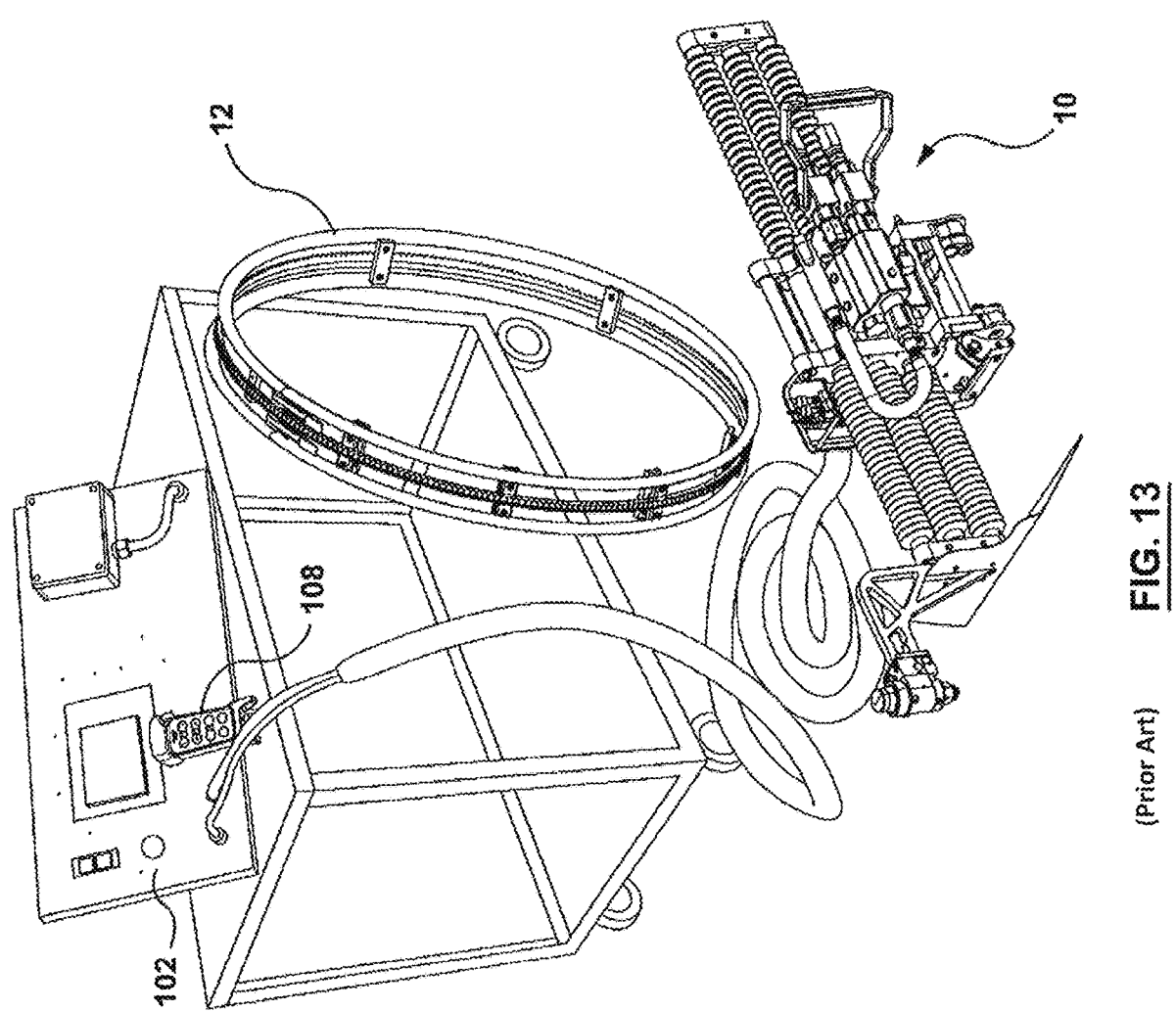
FIG. 13 is a photo of the apparatus of FIG. 5, connected to a control box.

FIG. 13 is a photo showing apparatus 10 connected to control box 102 by umbilical cable 136, which provides electrical power, compressed air, and a communications conduit. Wireless control pendant 108 and track 12 are also shown.

Figure 14:
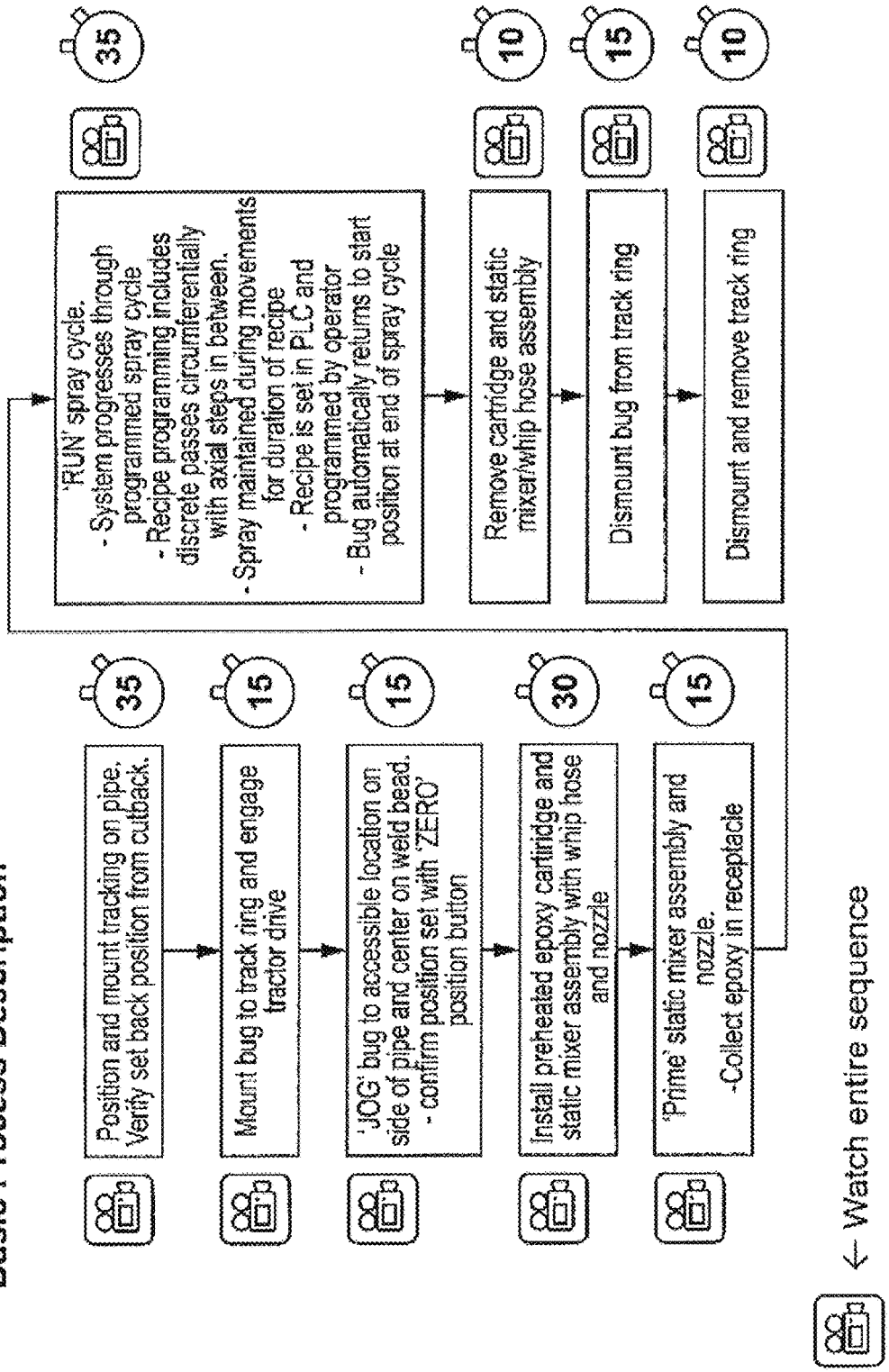
FIG. 14 is a schematic of a method of utilizing the apparatus of FIG. 5 to coat a pipe cutback region.
Figure 15:
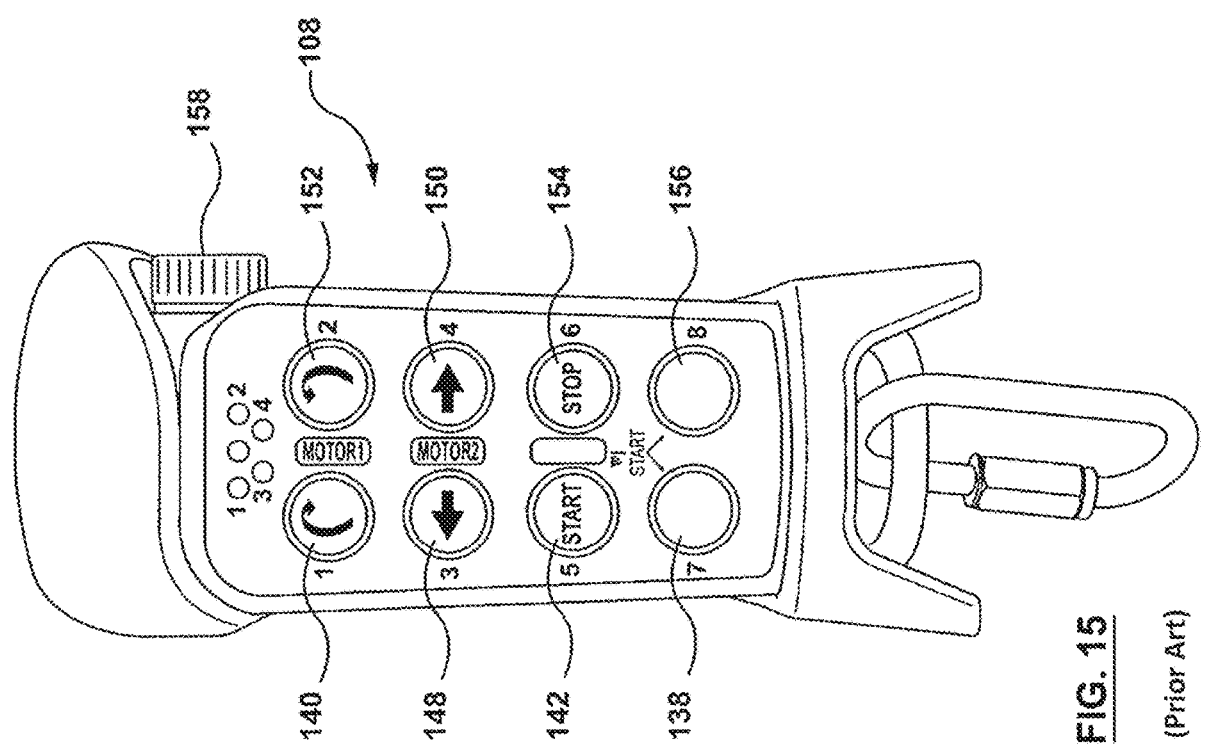
FIG. 15 is a photo close up of the wireless control pendant of the prior art.
Figure 16B:
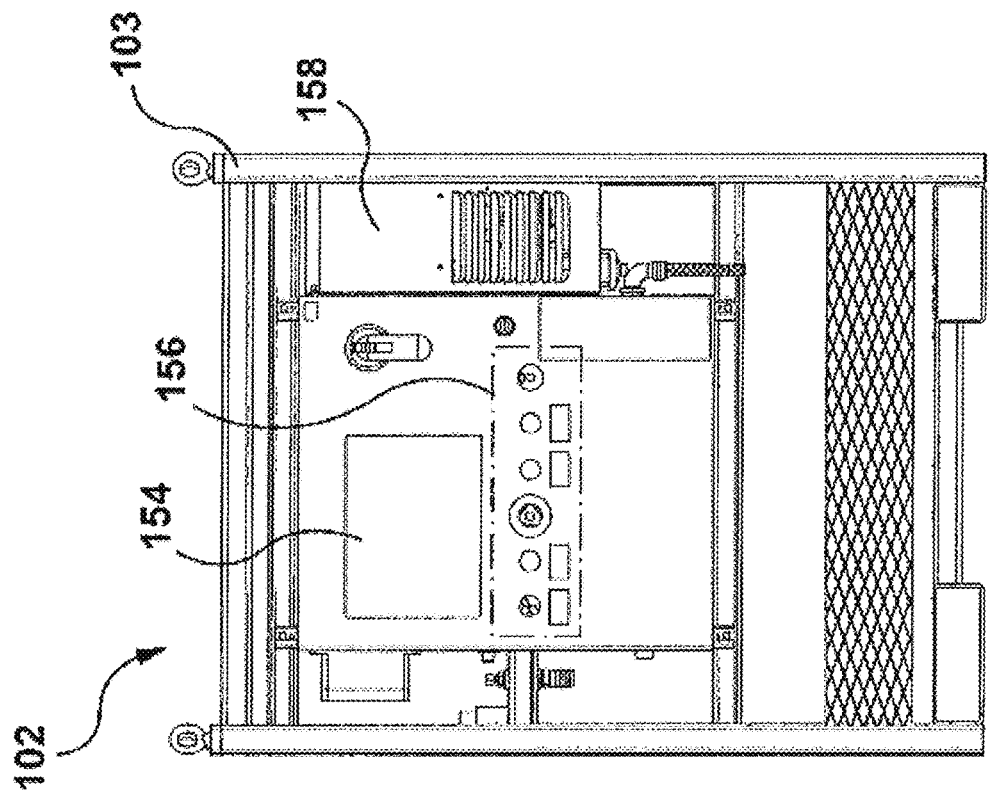
FIGS. 16A-16F show various views of a control panel for the apparatus according to the prior art.
Figure 16A:
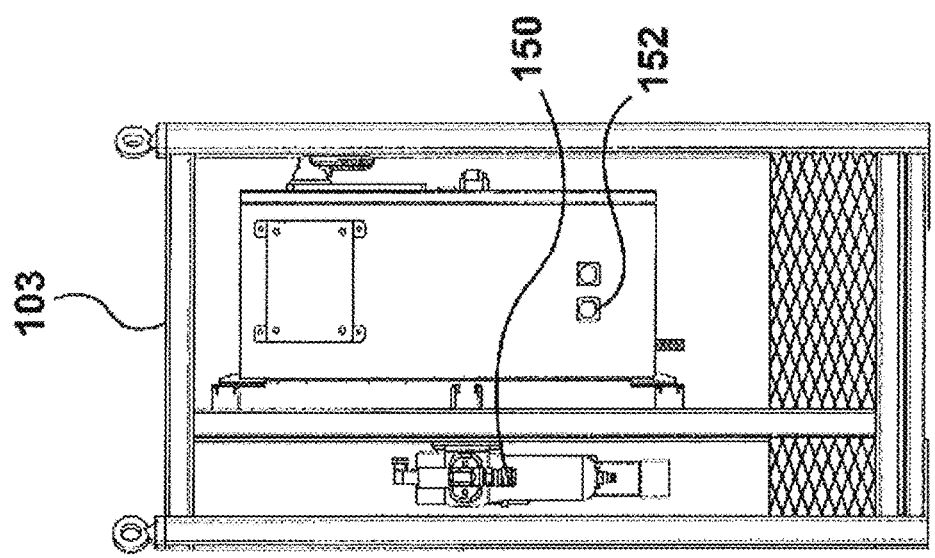
Figure 16D:
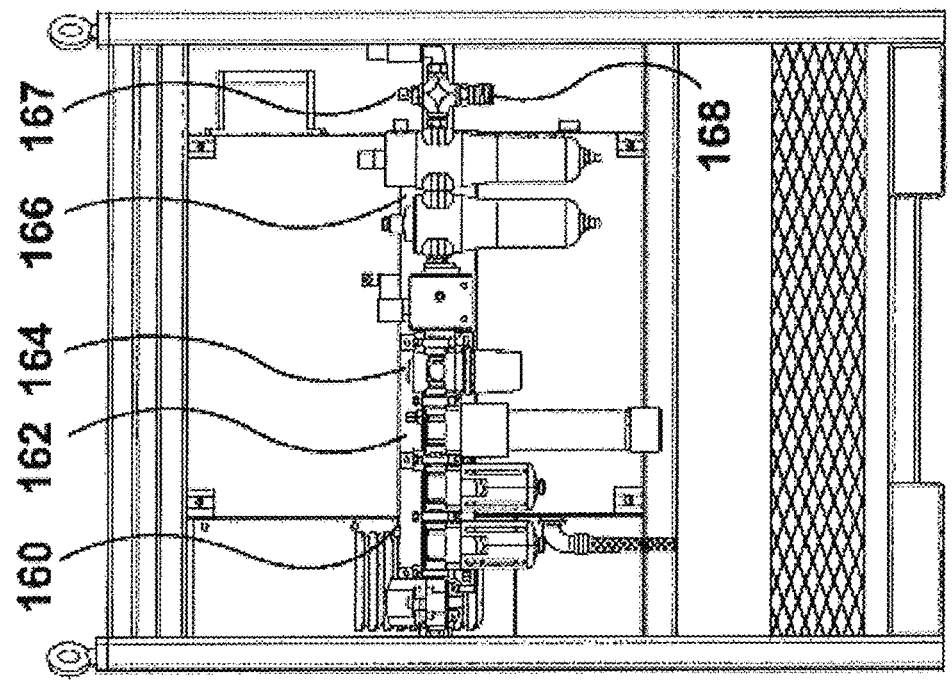
Figure 16C:
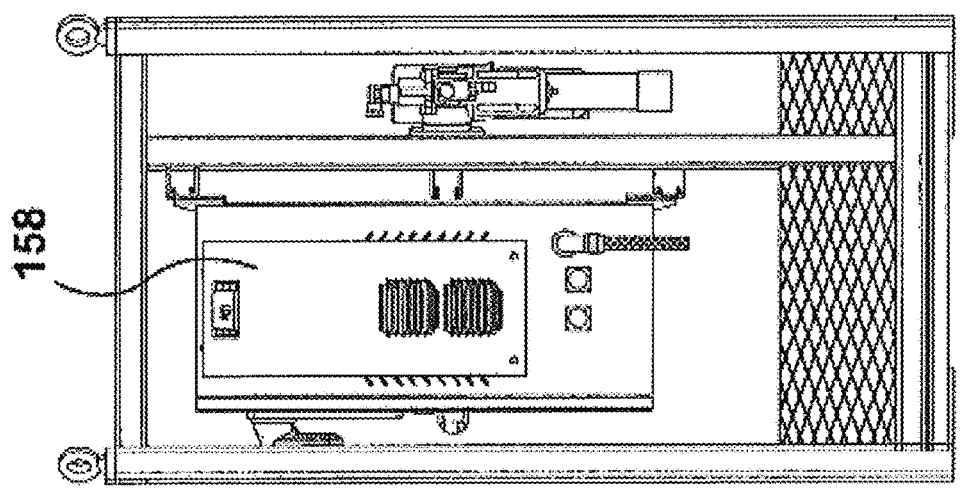
Figure 16F:
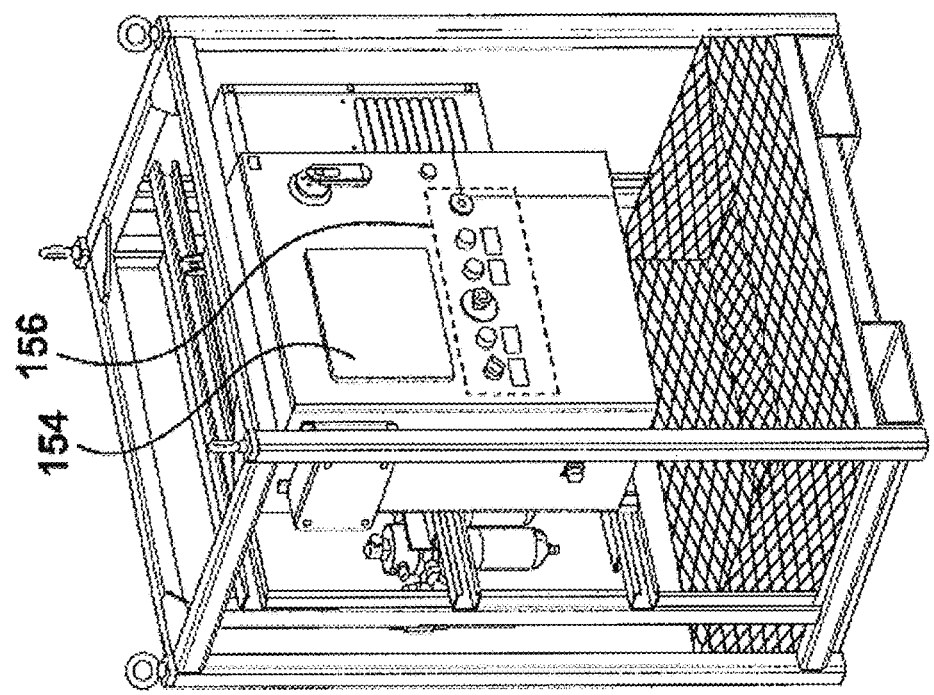
Figure 16E:
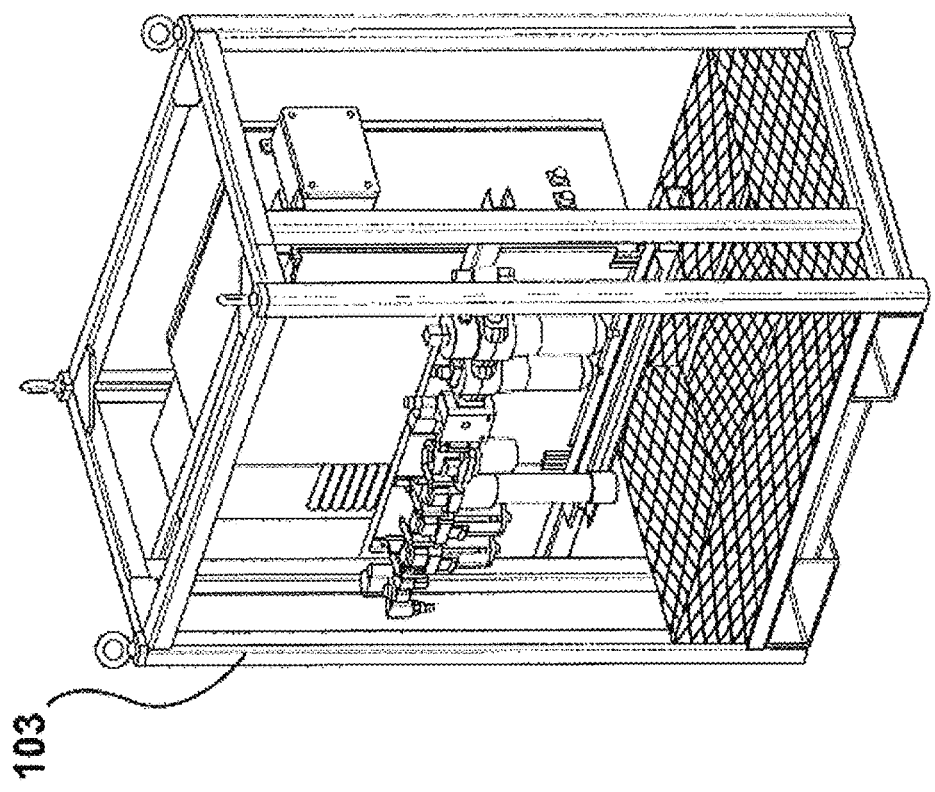

FIG. 14 is a schematic briefly describing the use of apparatus 10 to coat a cutback region. First, the track ring is positioned and mounted onto the outer coating layer of a pipe, proximal to the cutback region. The track ring is clamped in place. Apparatus 10 is mounted to the track ring so that the drive gear 18 is engaged onto rack 16, and locked in place with clamping cam handle 26. The servo motor 34 is engaged to "jog" apparatus 10 to an accessible location on the side of the pipe. The stepper motor 80 is engaged to center the end of arm 66 on the weld bead situated in the middle of the cutback region. The user confirms the position is set by pressing the "zero" position button 138 on the wireless control pendant 108, shown also at FIG. 15. A pre-heated component cartridge 48, 50 is installed in cartridge carriage 46. The component inlet 128 of static mixer assembly 126 is affixed to the end of the cartridge 48, 50 at cartridge nozzles 58, 60. The other end of static mixer assembly 126, containing built-in spray nozzle 132, is fixed into quick change adapter 88 and a compressed air source is affixed to air atomization input adapter 92. The static mixer assembly and nozzle is primed by pressing the "prime" button 140 on the wireless control pendant 108, which activates the cartridge gun body 56 to displace pistons 52, 54 to displace the two components out of the cartridge and into the mixer 126. The mixed plural component mixture is displaced through nozzle 124 and collected in a receptacle. The apparatus is now primed and ready to coat the pipe. The user pushes the "run" button 142 on the wireless control pendant 108, which initiates the spray cycle. Apparatus 10 progresses through a programmed spray cycle, rotating around the pipe on track 12 and moving arm 66 (and, as a result, spray nozzle 124) laterally to coat the entirety of the cutback region 15. The movement of the apparatus can be programmed in a wide variety of ways; in a preferred embodiment, the apparatus is repeatedly rotated circumferentially around the pipe, with lateral steps of the arm at each rotation. In a preferred embodiment, the spraying occurs continually, though pulse spraying or pauses in the spraying can also occur. As can be appreciated, servo motor 34, cartridge gun body 56, and/or stepper motor 80 may be electronically controlled in a programmable or pre-programmed manner through an on-board computer or through a computer at the control box 102. A user selects the parameters (pipe diameter, desired thickness of coating, and type of coating, for example) on a user interface (for example, control pendant 108) then initiate the start of the coating process; apparatus 10 would then automatically rotate and arm 66 would laterally displace appropriately, while at the same time the main controller would activate the cartridge gun body 56 for the desired application of coating. As shown in FIG. 15, Control pendant 108 also has controls for manual lateral displacement of the arm (out, 148, in, 150) and rotational displacement around the pipe (clockwise 140, counterclockwise 152). By pressing the "shift" button (156), the second function of the buttons can be accessed, with button 140 also used to prime the system, button 152 used to purge the system, and button 148 used to retract the cylinder. A large, easy to access emergency stop button 158 is also provided.

Once the cutback region 15 has been sprayed in its entirety, apparatus 10 returns automatically to its start position relative to the pipe, and the user can remove the now depleted cartridge 48, 50 and the mixer 126; in the case of disposable cartridge 48, 50 and/or mixer 126, disposing of them; in the case of a re-usable cartridge 48, 50 and/or mixer 126, placing them in a storage location for cleaning. The user can then unlock apparatus 10 from the track 12 by disengaging clamping cam handle 26, and remove apparatus 10 from the pipe. The track 12 can also be removed from the pipe and moved to the next cutback region.

As would be understood to a person of skill in the art, an automated cutback coating apparatus such as that herein described also has the advantage that it can collect data, such as confirmation that a coating was properly applied, the protocol it was applied with, and the type of component (for example, epoxy) used on the cutback. In this manner, the apparatus can provide objective, standardized, real time data regarding the integrity of the cutback region coating. For example, each cartridge could have a bar code or RFID tag, which would be read by a bar code reader/RFID reader located on an appropriate position on the apparatus. Part of the application protocol might require reading such a bar code before the application of coating can take place. This would reduce the risk of field substitution of inferior components, for example. The bar code reading would be sent, through controller 40 to the control box 102, and confirmation of an appropriate cartridge would be necessary before a user could apply the coating to the pipe. Similarly, a bar code or RFID reading can be taken off the pipe at or proximal to the cutback region, which would provide a unique identification of the specific cutback to which the apparatus is applying coating. This information, as well as confirmation of a successful (i.e. error free) coating, and the time and date the cutback was coated, the size of the pipe, the temperature of the coating components when leaving the reservoir housing (by having a temperature sensor located proximal to that point, or in the case of heated cartridges as described further below) can be recorded at the control box 102 or on memory (for example, a removable SD card) right on the apparatus, for audit or documentary purposes.

It would be understood that, although pneumatic or electrical driving of circumferential travel and/or lateral arm travel are shown, these could also be operated through hydraulic means. It would also be understood that although an external source of compressed gas and an external electric source are shown, in certain embodiments, the compressed gas, compressed fluid, and/or electrical source could be incorporated within the apparatus. For example, the apparatus may further comprise a battery or capacitor, which may be rechargeable, for example, a solar panel-charged battery or capacitor; a canister of compressed air, an electric or gas driven air compressor, or any other known means. For example, a disposable or refillable compressed air canister (not shown) can be connected to the back of cartridge gun body 56 to be used as a source of energy for compressing the pistons 52, 54 and thus displacing first coating component and second coating component out of the cartridges 48, 50.

Accordingly, in certain embodiments, the entire apparatus 10 can be self-contained, and does not require additional generators, coating containers, hoses, or connections, making apparatus 10 both more efficient and less dangerous to use.

For some coating components, it is advantageous to heat the components before application. Therefore, in certain embodiments, apparatus frame 20 may also comprise a heating means for heating the coating components in the reservoir. Alternatively, or in addition, a plurality of reservoir housings can be stored in a separate, self-contained, heated container, and pulled out and affixed to the apparatus frame 20 immediately before application.

Although not shown, coating systems containing more than two components may also be used, by providing a cartridge carriage 46 capable of containing more than two cartridges 48, 50. In some cases, this may require minor modifications to the coating actuator, for example, additional pistons or alternate displacement means may be required. In certain embodiments, the individual pistons (or other displacement means) are housed and a component of the reservoir housing itself, providing a universal connection with the coating actuator.

Rotational travel speed of the apparatus may be variable or constant, and typically may be anywhere from 0-1500 mm/s, depending on the pipeline application, the coating to be applied, and the geographic conditions.

In addition to the inventive design concepts disclosed above, additional features may enhance operation of the machines and/or systems disclosed.

FIG. 17 shows two pipes joined together by welding and inspection. Specifically, a first pipe 1710 is joined to a second pipe 1720 by a weld 1730. Pipes 1710 and 1720 are covered in the factory by factory insulation 1750 except for a bare portion 1740 of pipes 1710 and 1720 in proximity to weld 1730. Pipe portion 1740 continues to be referred to herein as the cutback region. FIG. 18 again shows the bare cutback region of the pipe between the factory coating to be coated. About 2 inches at the interface between factory coating 1750 and the bare pipe 1740 may be dressed to improve adhesion (e.g., adhesion of any coating sprayed on the cutback region). The dressing may taper off on both sides toward the weld and may provide a seal between the dressing and the factory coating.

Figure 20A:
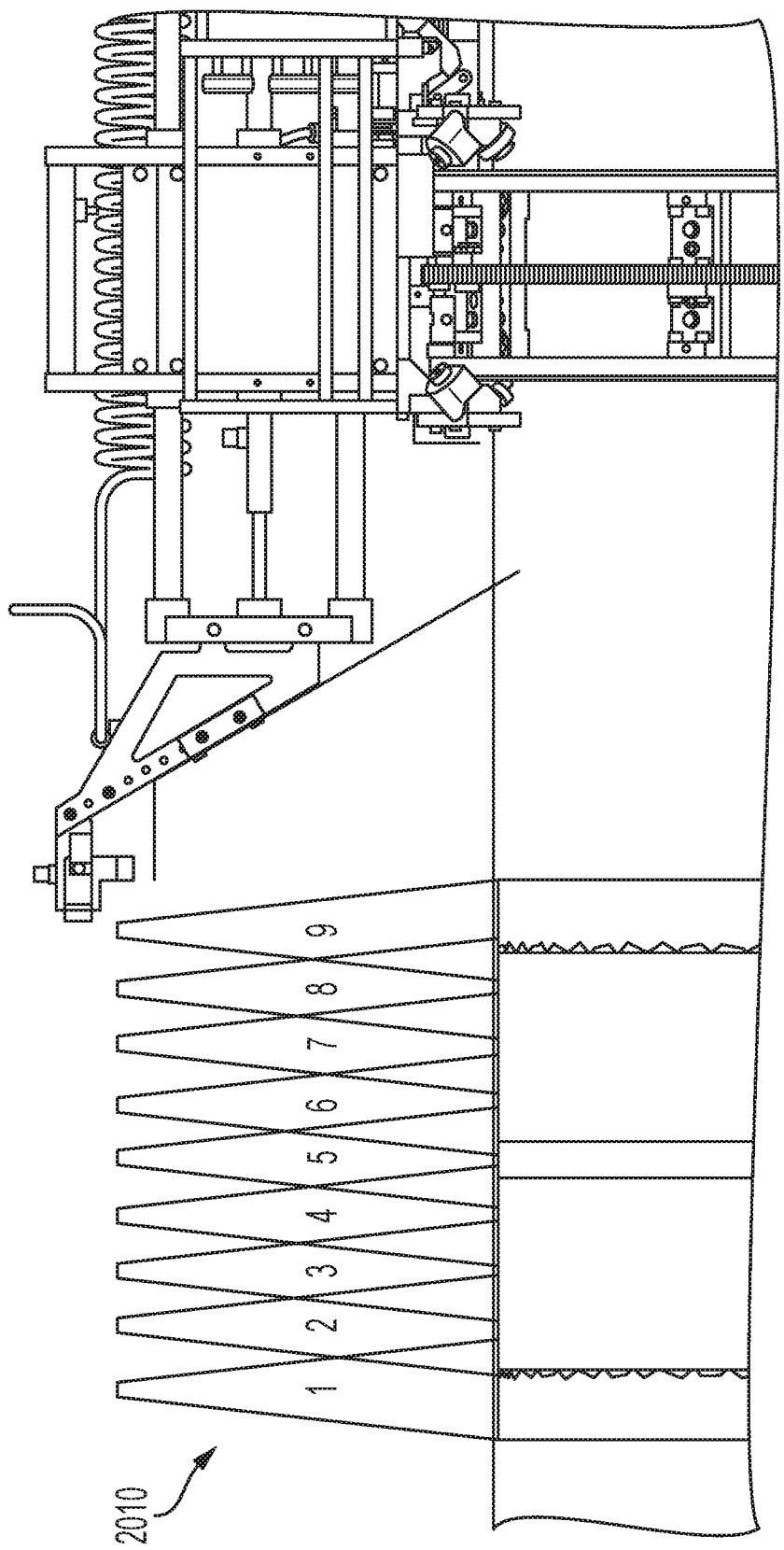
FIG. 20A shows an apparatus according to FIG. 1 strapped to the welded pipe according to FIG. 18 and indexed spray patterns.

FIG. 19 shows the spray apparatus 10 attached to pipe 1720. A spray stream 1920 flows from spray nozzle 32 in a fan shaped spray pattern onto weld 1730. As discussed above, spray nozzle 32 of apparatus 10 may move automatically and/or incrementally back and forth in a direction parallel the longitudinal axis of pipe 1720. So slide arm 66, stepper motor 80 and screw 82 function together with controller 40 to amount to an indexer for indexingly moving spray nozzle 32 longitudinally in, into and between discrete positions as show in FIG. 20A. Specifically, indexing may include not merely an automatic moving from position to position, but also a stopping for a period at a position (e.g., one of positions 1-9) before starting again. FIG. 20A shows 9 discrete spray pattern positions 2010 associated with 9 corresponding discrete spray nozzle 32 positions. The nine positions are aligned with the longitudinal axis of the pipe 1710 and the nine spray patterns are superimposed to showing how the spray patterns would overlap to cover the surface of the cutback longitudinally at that particular angular positioning of apparatus 1 (e.g., at 12 o'clock or 1 o'clock looking down the pipe). The combined spray patterns 2010 cover the cutback which includes the dressing right up to the edge of the factory coating 1750.

Figure 20B:
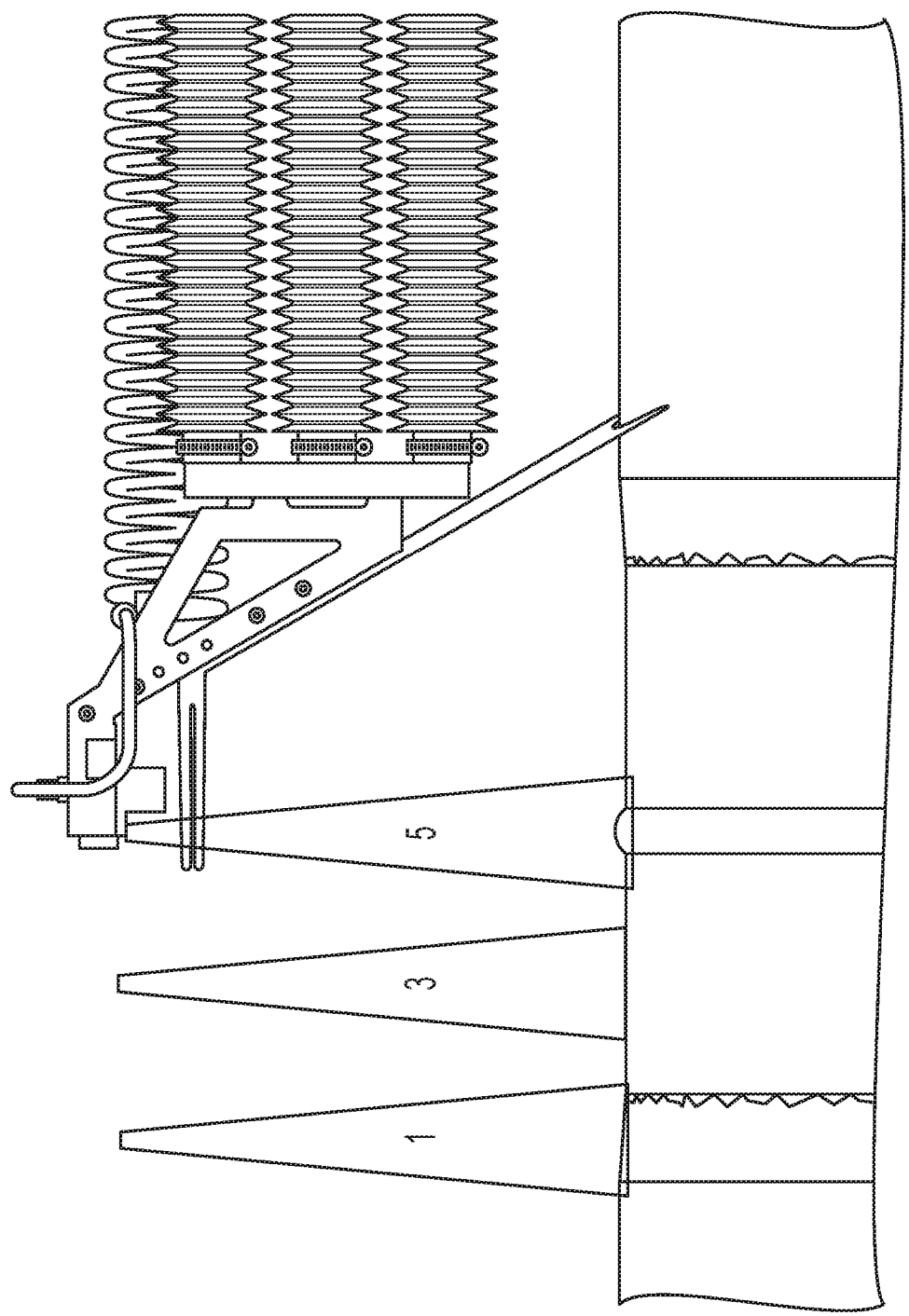
FIG. 20B shows an apparatus according to FIG. 1 strapped to the welded pipe according to FIG. 18. and indexed spray positions.

For a number of reasons, it may be desirable to apply spray coatings differently depending on the longitudinal indexing position (i.e., positions 1-9). For example, at some positions, the flow rate may be increased or decreased so that more or less spray material may be applied at that circular/ orbital longitudinal position. For example, in FIG. 20B, less spray may be needed at the longitudinal position nearest the factory coating where the dressing is (i.e., spray position 1) than where there is bare pipe (i.e., such as in position 3) since the dressing can be a partial coating. Similarly, it may be desirable to apply more coating at position 5 where weld 1730 is as that position has more surface area to cover than the bare pipe at position 3. When less spay is needed, the flow rate through nozzle 32 may be reduced during spraying at that longitudinal position in order to apply less coating material. Alternatively, the speed of the position of spray nozzle 32 might be increased so less time is spent applying material at a particular longitudinal position and less material is applied.

Figure 21A:
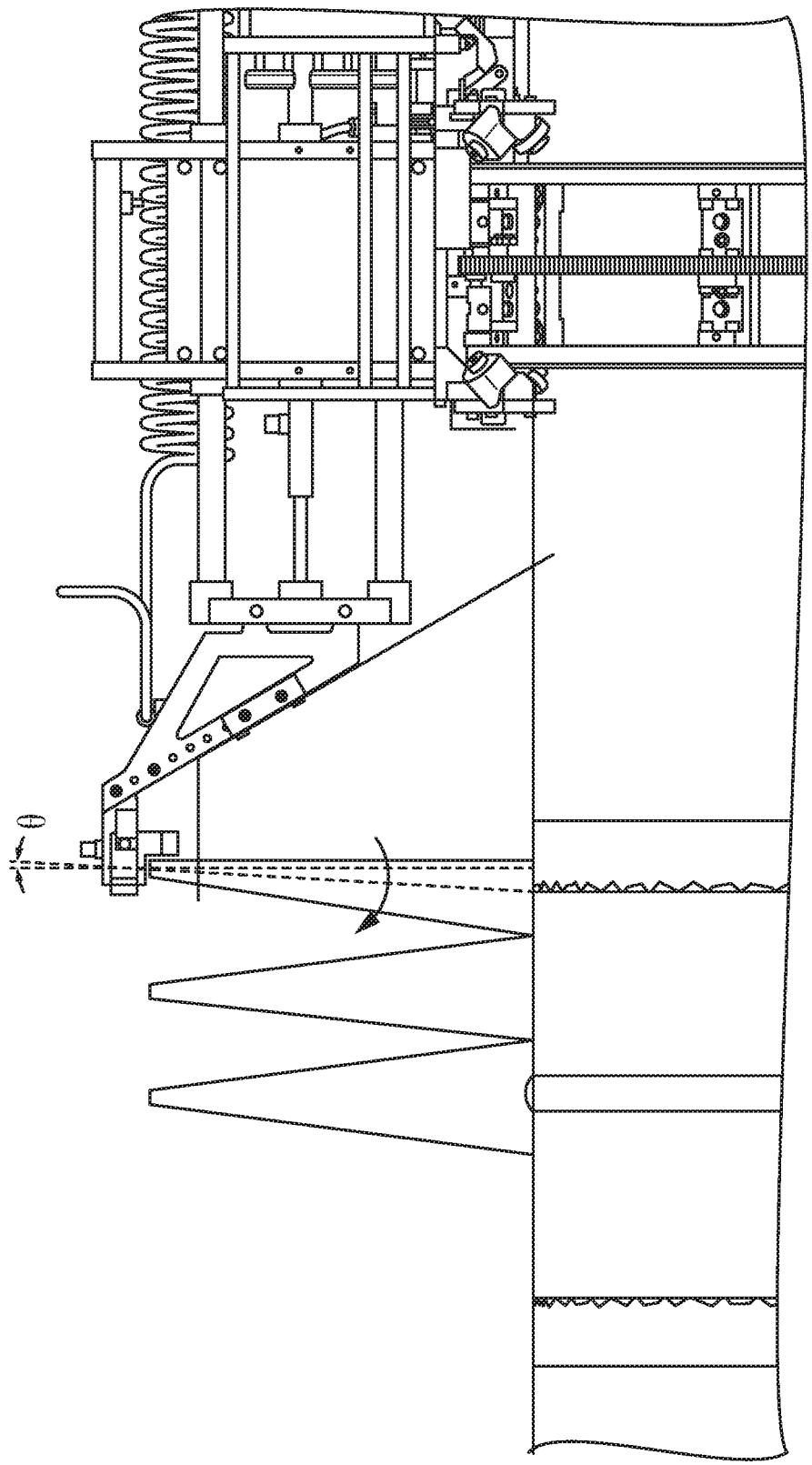
FIG. 21A shows an apparatus according to FIG. 1 fastened to a pipe with a spray stream tilted relative to a pipe longitudinal axis.
Figure 21B:
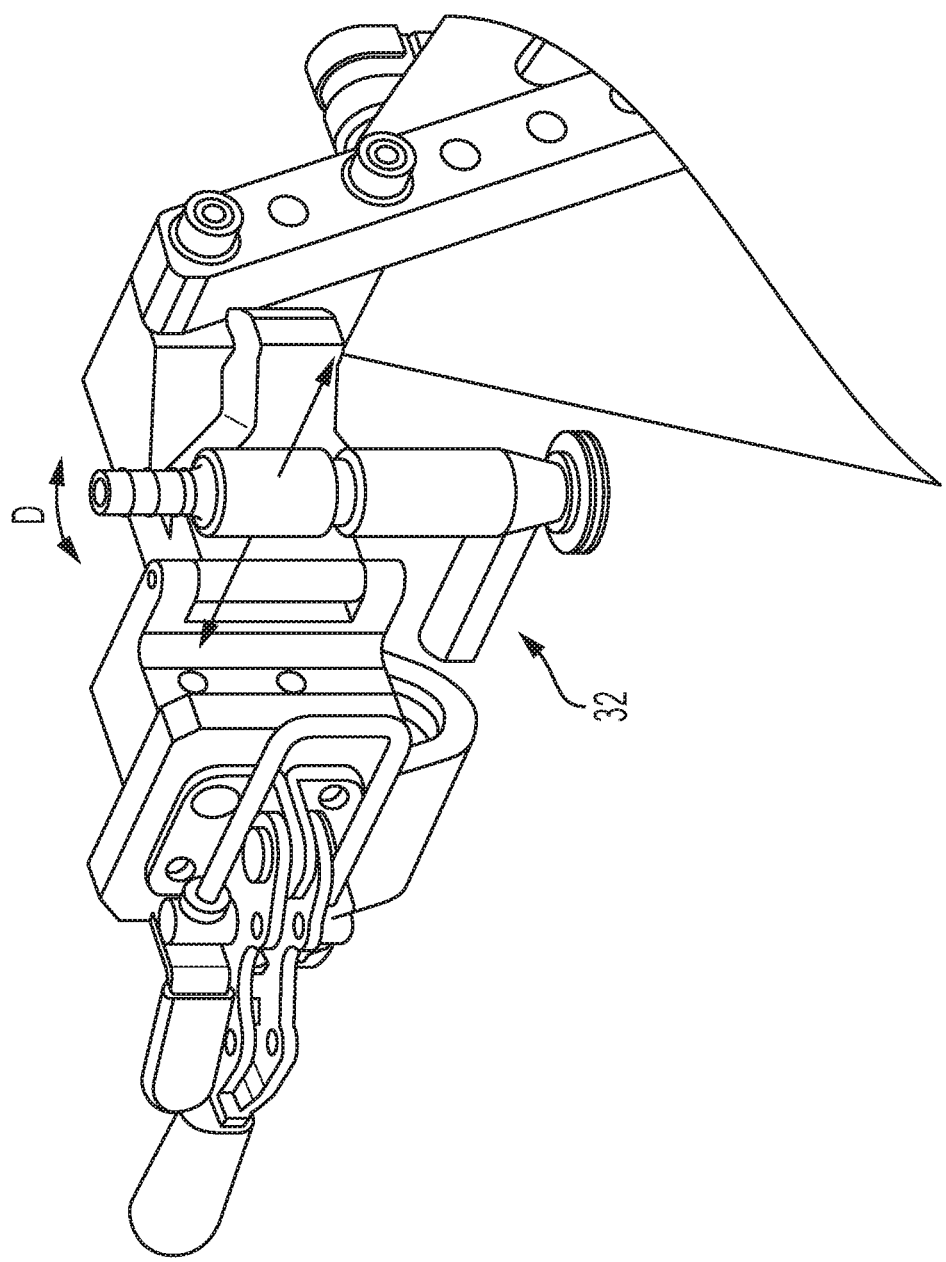
FIG. 21B shows a perspective view of a portion of the apparatus according to FIG. 1 with a pivot axis of a spray head perpendicular to a pipe longitudinal axis.

It has been discovered that the spray nozzle most uniformly and precisely distributes spray material and the spray pattern is most/best defined when spray material supply hose 134 defines a vertical channel immediately as material enters spray nozzle 32 from hose 134. In other words, the spray pattern is desirable when spray nozzle 32 is vertically oriented and at least an end portion of hose 134 is also vertically oriented to deliver spray material to nozzle 32 in line with nozzle 32. On the other hand, spray apparatus 10 may also employ a pray head tilt feature (i.e., nozzle 32 tilts with the spray head) in order to most effectively distribute spray material onto the pipe exterior. FIG. 21A shows a spray apparatus 10 which has sprayed three different streams of spray material at three different spray locations. Specifically, the spray location closest to spray apparatus 10 is sprayed at an angle that is tilted relative the two other pray material spray streams. In other words, the two leftmost spray streams of FIG. 21A are delivered by a spray nozzle that is vertically oriented while the rightmost spay stream is tilted toward the left. As discussed above, the ability of spray apparatus 10 to tilt its nozzle would enable spray apparatus to limit overspray at the edges of where spray is to be applied. FIG. 21B shows a spray head with a nozzle 32 or air spray tip. Nozzle 32 has a spray axis about which nozzle 32 can pivot or tilt in directions D in order to adjust the angle of the spray stream relative to the pipe longitudinal axis.

The tilt may be automatically adjusted to an angle theta (i.e., angle between a longitudinal center of the flow stream and a vertical line from pray nozzle 32 and perpendicular to the pipe longitudinal axis). Automatic or powered movement may be controlled by a controller (e.g., controller 40). Controller 40 may send a signal to mechanical movers (e.g., electric solenoids or pneumatic cylinders). The tilt angle may also be controlled by a mechanical structure such as a cam and/or cam follower which engages/pivots the nozzle at a particular position along the longitudinal travel of the spray head. In one embodiment the mechanical tilter can be a spring actuated device that triggers at set points in the longitudinal cross stream travel. In another embodiment the mechanical tilter could be motorized and provide continuous angle adjustment across the cross stream (as opposed to mere actuation at discrete positions). In any case, the tilt of the spray head may be adjusted with respect to the longitudinal position of the spray head along cutback region 15.

Figure 22:
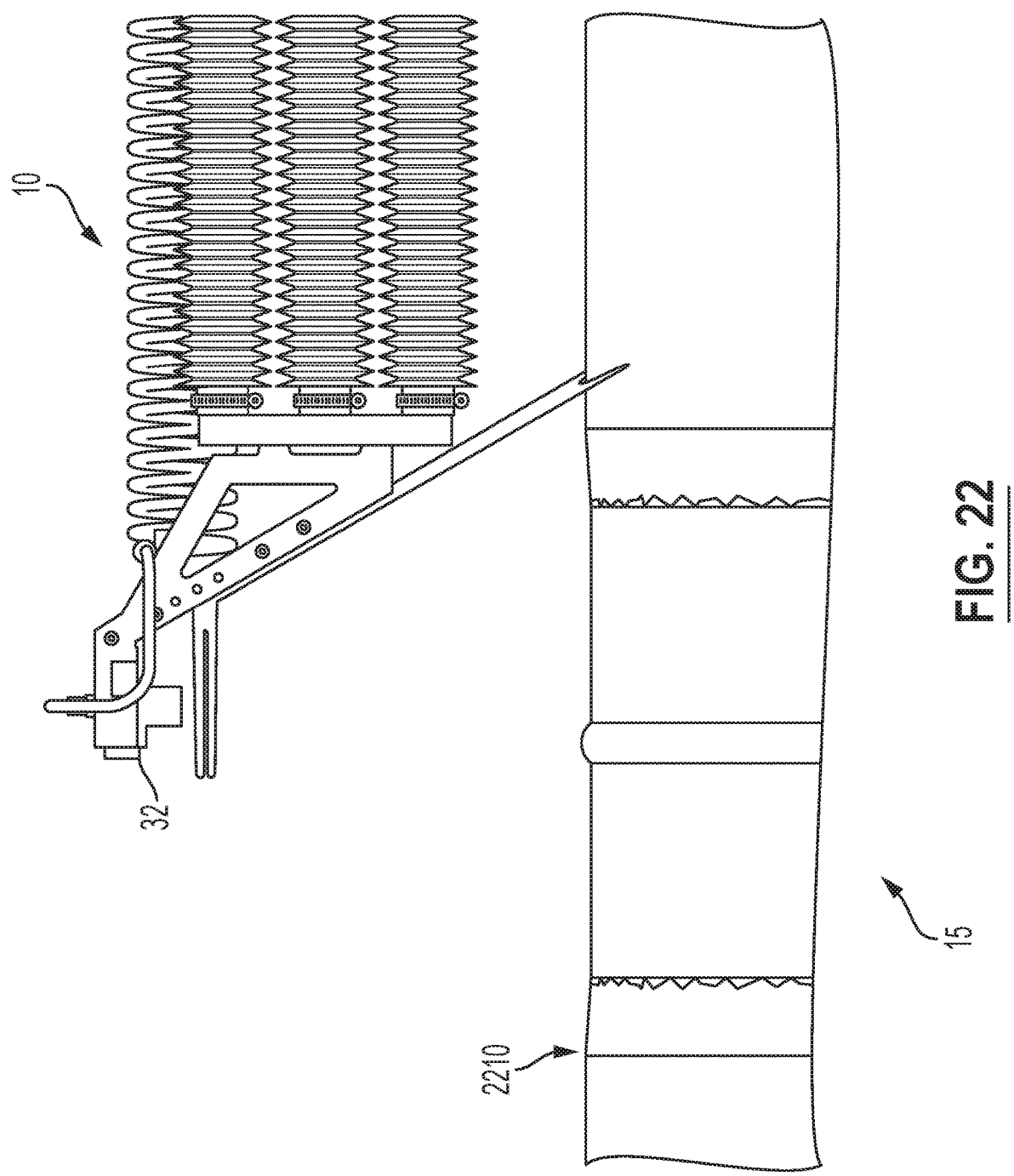
FIG. 22 shows an apparatus according to FIG. 1 strapped to the welded pipe according to FIG. 18. and a welding interface.

As mentioned above, spray nozzle 32 is supplied with a flow of pressurized air. The pressurized air is discharged from spray nozzle 32 together with the coating material in generally the same spray direction to disperse the coating material in a particular spray patter. For a given spray nozzle 32 at a given distance from the pipe surface, the spray pattern can be modified by adjusting, modifying, or regulating the pressure of supplied air. Specifically, increasing the supplied air pressure tends to focus the spray pattern (more control and/or more defined pattern) and lowering the pressure tends to loosen the spray pattern (less control and/or less defined pattern). For example, and as shown in FIG. 22, in order to avoid over spraying at the interface 2210 between the dressing and the factory coating, it may be desirable to increase air pressure to increase focus and control of the spray pattern to reduce overspray. On the other hand, in other longitudinal positions (e.g., positions 3-7) away from interface 2010, an optimal spray pressure may be used concerned only that a smooth coat is applied to the bare pipe and/or weld.

Figures 23A, 23B:
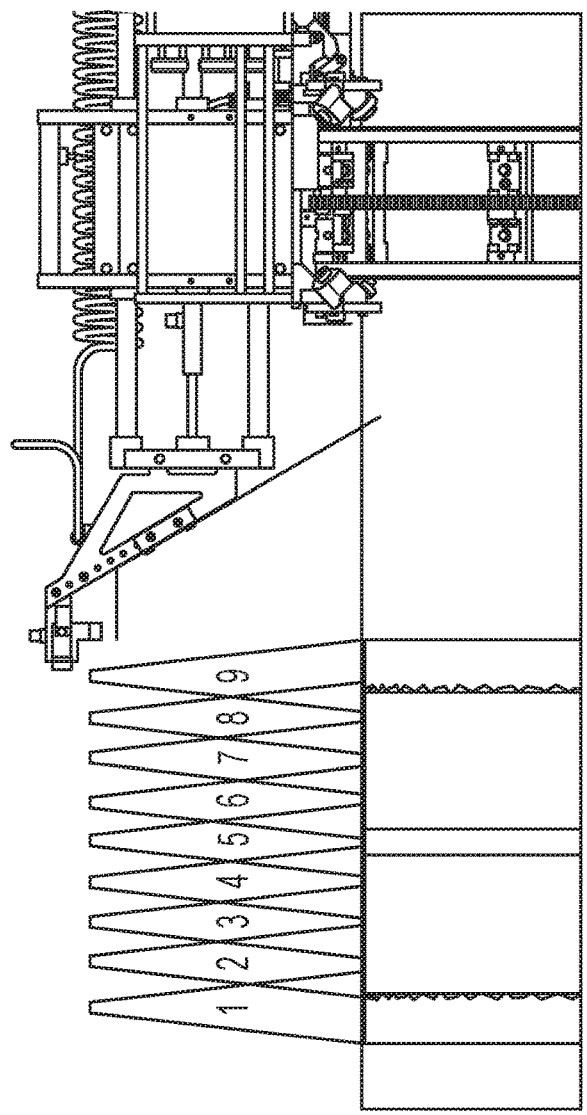
FIG. 23A shows an apparatus according to FIG. 1 strapped to the welded pipe according to FIG. 18 and indexed spray patterns.
FIG. 23B shows a table having suggested relative conditions for flow rate and spray pressure vs. indexing position.
Figure 25B:
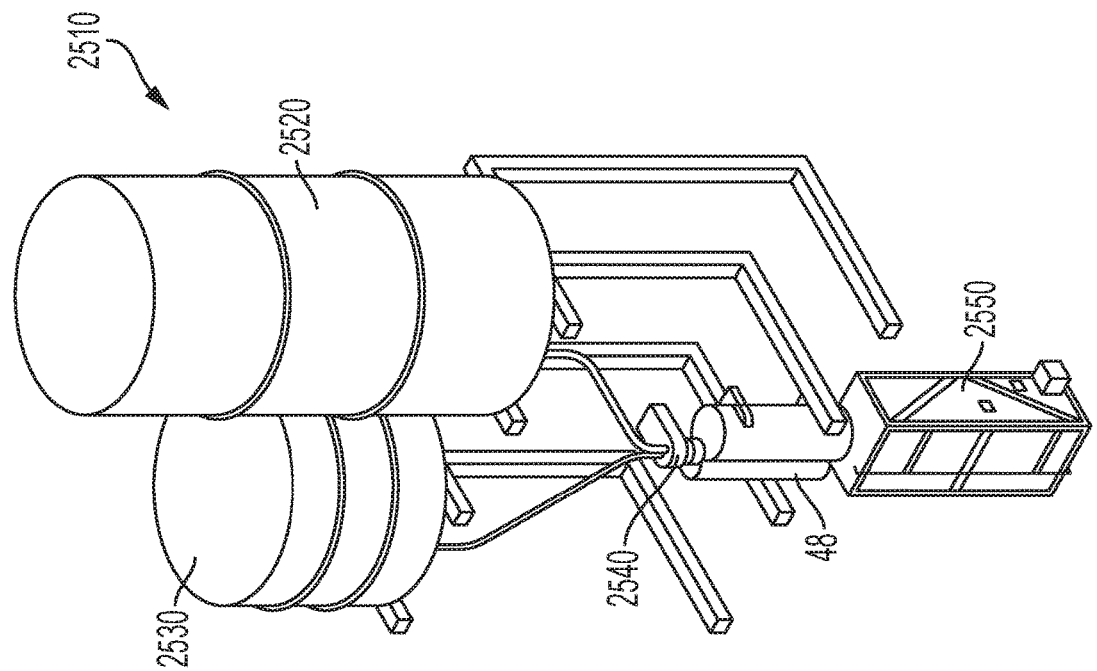
FIGS. 25A and 25B show a cartridge refill station according to the present invention in side front view and top perspective respectively.
Figure 25A:
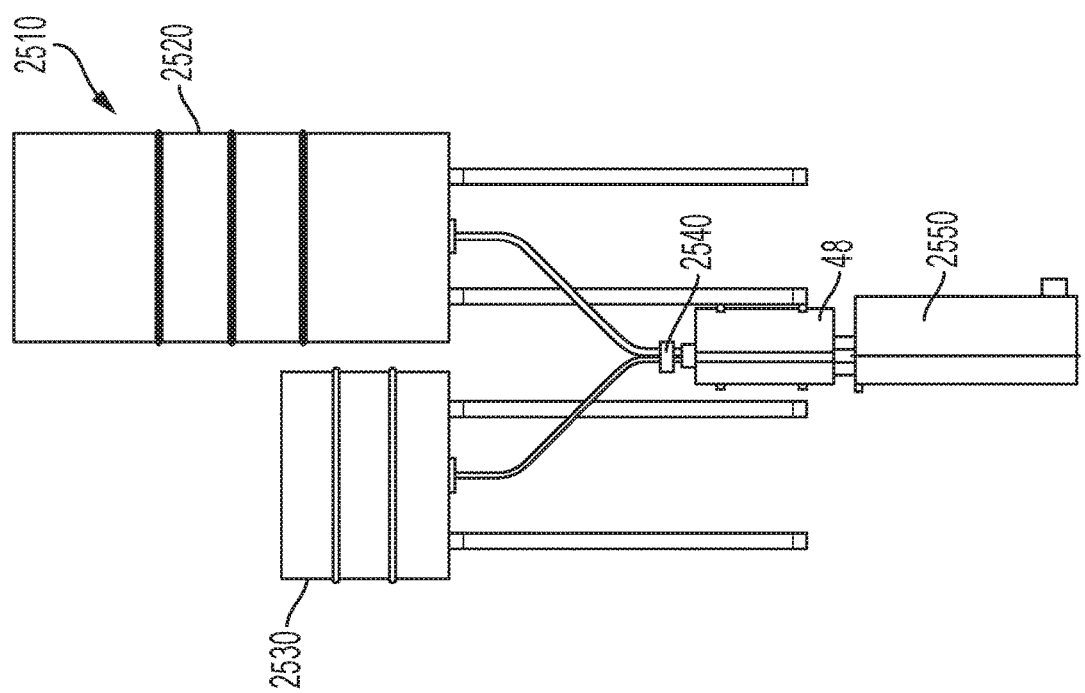
Figure 26:
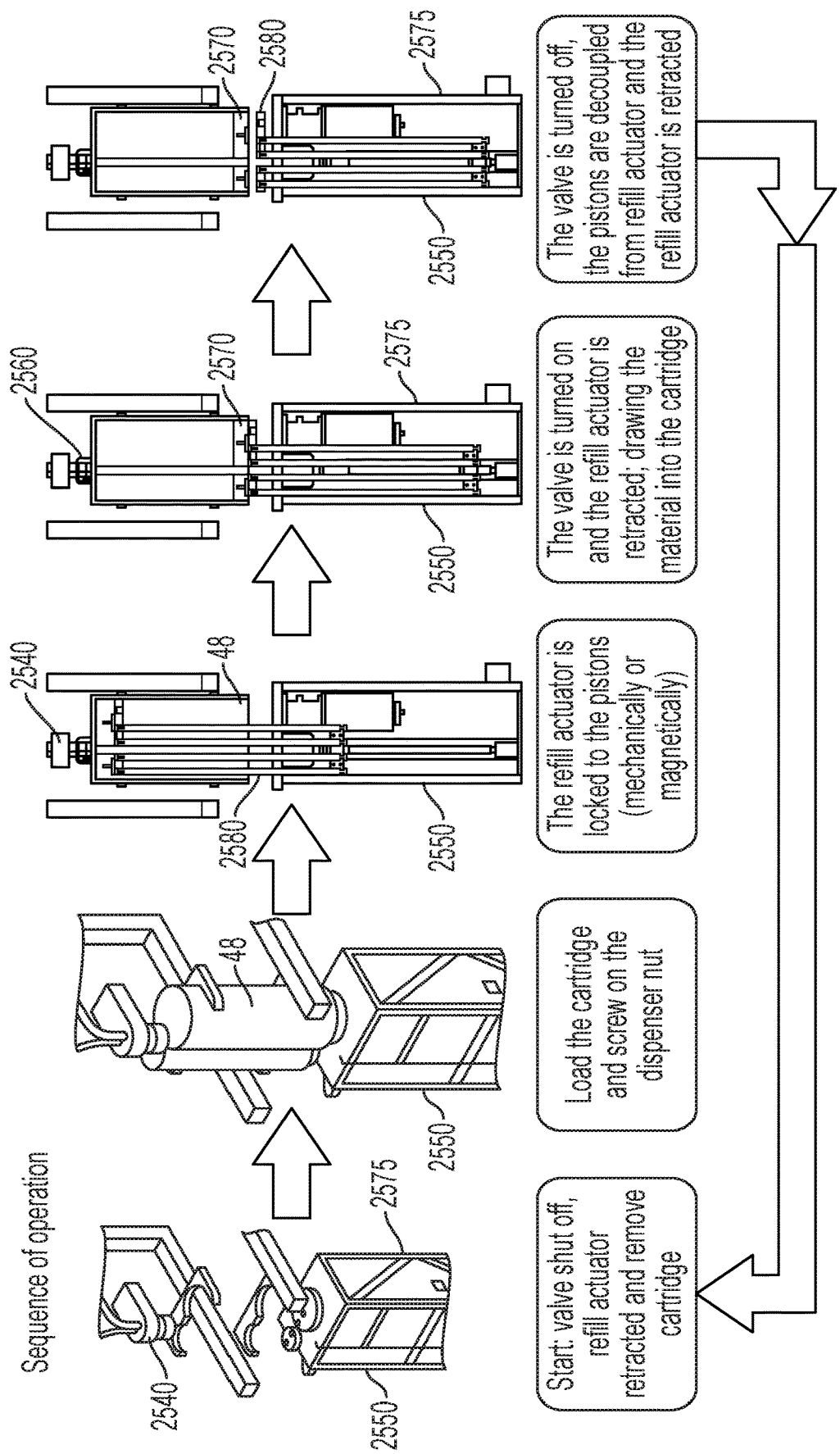
FIG. 26 shows steps in a process of refilling a cartridge using the cartridge refill station of FIGS. 25A and 25B.

FIGS. 23A and 23B show a chart that describes some suggestions for varying certain parameters (i.e., flow rate and spray pressure) for each of the nine indexed longitudinal positions described above. For example, at position 1 where less coating material is needed on the dressing, but more control is needed to avoid overspray, the flow rate can be relatively "LOW" compared to a bare pipe position and the spray pressure can be relatively "HIGH" compared to bare pipe position. In addition, for example, at position 3 where the spray pattern only covers bare pipe, both flow rate and nozzle air pressure can be "NORMAL" (i.e., higher and lower respectively relative to position 1). Finally, at the weld position 5, flow rate can be high to cover the additional area of the weld and spray pressure can be normal because spray pattern focus or definition is not critical at the weld away from the dressing and factory coating.

FIG. 24 shows the apparatus 10 installed on a pipe looking down the longitudinal axis of the pipe. FIG. 24 shows various angular positions of the apparatus 10. The present invention contemplates a spray machine that is also capable of adjusting the coating material flow rate and/or the nozzle air pressure in terms of the angular position of apparatus 10 as shown in FIG. 24. As apparatus 10 moves around the pipe, spray from the nozzle which is subject to gravity is applied to the pipe in a different pattern depending on the position of apparatus 10. In other words, a spray radially inward from an apparatus position of 3:00 o'clock or 9:00 o'clock would create a pattern on the pipe slightly lower relative to spray nozzle 32 than the pattern that would be created had the apparatus 10 been at 12:00 o'clock. In addition, spraying of coating material while spray nozzle 32 is moving relative to the pipe creates a spray pattern different that when there is no movement or a different speed movement. Therefore, varying the coating material flow rate and/or the nozzle air spray pressure relative to either radial position of apparatus 10 or speed or change of speed of the spray nozzle can provide additional control of the ultimate application of coating material on the pipe.

In use, the track 12 is fixed on the pipe. Then the apparatus 10 is adjusted (calibrated) so that the mid-stroke of the longitudinal actuator 80, 82, 40 of sliding arm 66 is in line with weld 1730. In other words, slide arm 66 is set to have equal reach from weld 1730 toward the factory coating 1750 in both longitudinal directions. Slide arm 66 is also adjusted so that it extends longitudinally in alignment with the longitudinal axis of pipe 1710, 1720. Spray nozzle 32 is indexed to one of the 9 positions. The process can have more or less than 9 positions depending on the size of the pipe, size of the spray patter, distance between the spray nozzle and the pipe, etc. Apparatus 10 can then apply coating material orbitally around the pipe at the particular indexed position and the particular spray setting (i.e., low or high flow rate vs. index position, low or high spray pressure vs. index position, low or high flow rate vs. axial apparatus position, low or high spray pressure vs. axial apparatus position).

As discussed above, cartridges 48 and 50 are refillable. Cartridges 48, 50 include and input/output valve 2560 through which coating material may enter cartridge 48, 50 during refill or leave cartridge 48, 50 during operation of apparatus 10. Cartridge 48, 50 also includes a moving wall or piston 2570. The present invention contemplates a refill station 2510. Filling station 2510 includes one or more material storage containers 2520, 2530. Material storage containers 2520, 2530 include one or more discharge valve(s) 2540. The discharge valves 2540 may include quick connect connectors for quick connection to an input/output valve of cartridge 48. Filling station 2510 also includes a fill actuator 2550. Fill actuator 2550 is a powered (e.g., electric or pneumatic) actuator with an extension that extend and retracts from a base. A pneumatically powered actuator may include a piston and cylinder and an electric actuator may include a motor and screw mechanism. Extension 2580 is connectible to moving wall 2570 of cartridge 48, 50. Extension 2580 can be connected to moving wall 2570 of cartridge 48, 50. When extension 2580 is connected to moving wall 2570, fill actuator 2550 can retract extension 2580 relative to base 2575 so that moving wall 2570 is retracted relative to cartridge 48, 50 to draw coating material from storage containers 2520, 2530, through discharge valve 2540, through input/output valve and into cartridge 48, 50 for refill of cartridge 48, 50.

In use, a technician approaches refill station 2510. The technician connects an empty cartridge 48, 50 to refill station 2510. Specifically, input/output valve 2560 is quick connected to discharge valve 2540. That quick connection may or may not automatically open discharge valve 2540. In addition, extension 2580 is connected to moving wall 2570. Fill actuator 2550 is then actuated to retract extension 2580 and moving wall 2570 to draw coating material into respective compartments from fill containers 2520, 2530 in the manner described above. The technician then quick disconnects input/output valve 2560 from discharge valve 2540 and valve 2540 may or may not then automatically close. Cartridge 48, 50 may then be reinstalled into apparatus 10 for discharge of its new contents.

The embodiments of the present disclosure described above are intended to be examples only. The present disclosure may be embodied in other specific forms. Alterations, modifications and variations to the disclosure may be made without departing from the intended scope of the present disclosure. While the systems, devices and processes disclosed and shown herein may comprise a specific number of elements/components, the systems, devices and assemblies could be modified to include additional or fewer of such elements/components. For example, while any of the elements/components disclosed may be referenced as being singular, the embodiments disclosed herein could be modified to include a plurality of such elements/components. Selected features from one or more of the above-described embodiments may be combined to create alternative embodiments not explicitly described. All values and sub-range s within disclosed ranges are also disclosed. The subject matter described herein intends to cover and embrace all suitable changes in technology. All references mentioned are hereby incorporated by reference in their entirety.

What is claimed is:

1. A sprayer for coating a girth weld and a cutback region surrounding said girth weld on a steel pipe, the steel pipe including a longitudinal axis, the sprayer comprising:
    a track affixed around the steel pipe proximal longitudinally to said cutback region and affixed circumferentially around said steel pipe,
    a frame including a roller carriage configured for rollably mounting to the track,
    said frame further including a powered propulsion assembly for propelling said roller carriage circumferentially around said track;
    said sprayer including an arm, said arm cantilevered longitudinally from said roller carriage; said arm including a spray head extending therefrom;
    said frame also including a powered indexing assembly for moving said arm and said spray head longitudinally relative to said roller carriage;
    the frame further including a cartridge for storing a liquid to be sprayed onto the steel pipe via the spray head; the frame also including a powered cartridge gun for forcing the liquid out of the cartridge to the spray head;
    the frame further including a pressurized air supply for delivering pressurized air to the spray head to control a pattern of the liquid as said liquid is sprayed from said spray head;
    a controller, the controller controlling the powered propulsion assembly, the powered indexing assembly, and one of the powered cartridge gun and a pressure level from the pressurized air supply to the spray head to respectively vary a flow rate of the liquid supplied to the spray head or vary a spray pattern,
        wherein the control of the powered cartridge gun or the pressurized air supply depends on a longitudinal position of the spray head.

2. The sprayer of claim 1, wherein the controller controls both the powered cartridge gun and the pressure level from the pressurized air supply to the spray head.

3. The sprayer of claim 1, wherein control of the powered propulsion assembly, the powered indexing assembly, and one of the powered cartridge gun and the pressure level from the pressurized air supply to the spray head depends upon a longitudinal indexed position of the spray head along the cutback region.

4. The sprayer of claim 2, wherein the controller directs the powered cartridge gun to vary a flow rate of the liquid supplied to the spray head.

5. The sprayer of claim 4, where a variation in the flow rate is dependent on the longitudinal position of the spray head along the cutback region.

6. The sprayer of claim 2, wherein the controller directs the pressurized air supply to vary a pressure of air supplied to the spray head.

7. The sprayer of claim 6, wherein a variation in flow rate is dependent of the longitudinal position of the spray head along the cutback region.

8. The sprayer of claim 2, wherein the controller directs the powered cartridge gun to vary a flow rate and directs the pressurized air supply to vary an air pressure supplied to the spray head.

9. The sprayer of claim 2, wherein the controller sets a thickness of an applied spray material by directing the powered cartridge gun to vary a flow rate, directing the pressurized air supply to vary an air pressure supplied to the spray head, and by directing one of the powered propulsion assembly and the powered indexing assembly to control a speed of the spray head.

10. The sprayer of claim 1, wherein the controller directs the powered indexing assembly to indexingly adjust the spray head into multiple longitudinal positions along the cutback region so that adjacent index positions produce spray patterns that overlap.

11. The sprayer of claim 1, wherein the spray head includes a spray nozzle and wherein the spray nozzle is pivotable relative to the arm.

12. The sprayer of claim 1, wherein the sprayer further includes a material supply hose for supplying spray material to a spray nozzle of the spray head and wherein at least a portion of the material supply hose at the connection between the material spray hose and the spray nozzle guides spray material parallel to a longitudinal axis of the spray nozzle.

\* \* \* \* \*